United States Patent
Raghavan et al.

(10) Patent No.: US 6,780,138 B2
(45) Date of Patent: Aug. 24, 2004

(54) FAMILY OF MULTI-SPEED PLANETARY TRANSMISSION MECHANISMS HAVING THREE PLANETARY GEARSETS, THREE CLUTCHES, AND TWO BRAKES

(75) Inventors: Madhusudan Raghavan, West Bloomfield, MI (US); Patrick Benedict Usoro, Troy, MI (US); Chi-Kuan Kao, Troy, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/278,603

(22) Filed: Oct. 23, 2002

(65) Prior Publication Data

US 2004/0082426 A1 Apr. 29, 2004

(51) Int. Cl.$^7$ .............................................. F16H 3/62
(52) U.S. Cl. ........................................ 475/276; 475/277
(58) Field of Search ................................ 475/275, 276, 475/277, 278, 279, 282, 288

(56) References Cited

U.S. PATENT DOCUMENTS

| | | | | |
|---|---|---|---|---|
| 3,971,268 A | * | 7/1976 | Murakami et al. | 475/276 |
| 3,987,690 A | * | 10/1976 | Murakami et al. | 475/276 |
| 4,070,927 A | | 1/1978 | Polak | 74/765 |
| 4,089,239 A | * | 5/1978 | Murakami et al. | 475/277 |
| 4,709,594 A | | 12/1987 | Maeda | 74/753 |
| 5,106,352 A | | 4/1992 | Lepelletier | 475/280 |
| 5,599,251 A | | 2/1997 | Beim et al. | 475/275 |
| 6,053,839 A | | 4/2000 | Baldwin et al. | 475/281 |
| 6,071,208 A | | 6/2000 | Koivunen | 475/275 |
| 6,083,135 A | | 7/2000 | Baldwin et al. | 475/276 |
| 6,217,474 B1 | | 4/2001 | Ross et al. | 475/269 |
| 6,572,507 B1 | * | 6/2003 | Korkmaz et al. | 475/276 |
| 6,648,790 B2 | * | 11/2003 | Raghavan et al. | 475/280 |

FOREIGN PATENT DOCUMENTS

| | | |
|---|---|---|
| EP | 1033510 | 9/2000 |
| JP | 9-126283 | 5/1997 |

* cited by examiner

Primary Examiner—Roger Pang
(74) Attorney, Agent, or Firm—Kathryn A. Marra

(57) ABSTRACT

The family of six-speed planetary transmissions incorporates three planetary gearsets and five torque-transmitting mechanisms, which are engaged in combinations of two to establish at least six forward speeds and one reverse speed within the planetary transmission. The five torque-transmitting mechanisms are comprised of three rotating type torque-transmitting mechanisms (clutches) and two stationary type torque-transmitting mechanisms (brakes). Each of the three planetary gearsets has three members with a first member of the first planetary gearset being continuously interconnected with a first member of the second planetary gearset. A second member of the first planetary gearset is continuously interconnected with a first member of the third planetary gearset. A second member of the second planetary gearset is continuously interconnected with a second member of the third planetary gearset. The input shaft and output shafts are continuously connected with selected members of the planetary gearsets. The five torque-transmitting mechanisms are effective to provide interconnections between the planetary gearsets as well as between the planetary gearset members and the transmission housing to establish the forward and reverse speed ratios.

3 Claims, 12 Drawing Sheets

| | RATIOS | 56 | 58 | 50 | 52 | 54 |
|---|---|---|---|---|---|---|
| REVERSE | -3.72 | | X | X | | |
| NEUTRAL | 0 | | X | | | |
| 1 | 4.56 | X | X | | | |
| 2 | 2.61 | X | | X | | |
| 3 | 1.86 | X | | | X | |
| 4 | 1.34 | X | | | | X |
| 5 | 1.00 | | | | X | X |
| 6 | 0.72 | | X | | | X |

(X=engaged)

Ring Gear/Sun Gear Tooth Ratios: $\frac{R1}{S1}=1.54, \frac{R2}{S2}=2.93, \frac{R3}{S3}=2.40$

| Ratio Spread | 6.34 |
|---|---|
| Ratio Steps | |
| REV/1 | -0.82 |
| 1/2 | 1.75 |
| 2/3 | 1.40 |
| 3/4 | 1.39 |
| 4/5 | 1.34 |
| 5/6 | 1.39 |

| | RATIOS | 156 | 158 | 150 | 152 | 154 |
|---|---|---|---|---|---|---|
| REVERSE | -4.26 | | X | | X | |
| NEUTRAL | 0 | | | | X | |
| 1 | 5.14 | X | | | X | |
| 2 | 3.34 | X | X | | | |
| 3 | 1.84 | X | | X | | |
| 4 | 1.34 | | X | X | | |
| 5 | 1.00 | | | X | | X |
| 6 | 0.77 | | X | | | X |

(X=engaged)

Ring Gear/Sun Gear Tooth Ratios: $\frac{R1}{S1}=2.33, \frac{R2}{S2}=1.88, \frac{R3}{S3}=2.34$

| Ratio Spread | 6.68 |
|---|---|
| Ratio Steps | |
| REV/1 | -0.83 |
| 1/2 | 1.54 |
| 2/3 | 1.82 |
| 3/4 | 1.38 |
| 4/5 | 1.34 |
| 5/6 | 1.30 |

|  | RATIOS | 256 | 258 | 250 | 252 | 254 |
|---|---|---|---|---|---|---|
| REVERSE | -4.52 |  | X |  |  | X |
| NEUTRAL | 0 |  |  |  |  | X |
| 1 | 5.12 | X |  |  |  | X |
| 2 | 3.61 | X | X |  |  |  |
| 3 | 1.91 | X |  | X |  |  |
| 4 | 1.31 |  | X | X |  |  |
| 5 | 1.00 |  |  | X | X |  |
| 6 | 0.81 |  | X |  | X |  |

(X=engaged)

Ring Gear/Sun Gear Tooth Ratios: $\frac{R1}{S1}=2.61, \frac{R2}{S2}=1.93, \frac{R3}{S3}=3.00$

| Ratio Spread | 6.36 |
|---|---|
| Ratio Steps |  |
| REV/1 | -0.88 |
| 1/2 | 1.42 |
| 2/3 | 1.89 |
| 3/4 | 1.46 |
| 4/5 | 1.31 |
| 5/6 | 1.24 |

| | RATIOS | 356 | 358 | 350 | 352 | 354 |
|---|---|---|---|---|---|---|
| REVERSE | -1.67 | X | | X | | |
| NEUTRAL | 0 | X | | | | |
| 1 | 3.33 | X | X | | | |
| 2 | 1.89 | X | | | | X |
| 3 | 1.33 | | X | | | X |
| 4 | 1.00 | | | | X | X |
| 5 | 0.79 | | X | | X | |
| 6 | 1.61 | | X | X | | |

(X=engaged)

Ring Gear/Sun Gear Tooth Ratios: $\frac{R1}{S1}=2.33, \frac{R2}{S2}=1.68, \frac{R3}{S3}=2.70$

| Ratio Spread | 5.50 |
|---|---|
| Ratio Steps | |
| REV/1 | -0.50 |
| 1/2 | 1.77 |
| 2/3 | 1.42 |
| 3/4 | 1.33 |
| 4/5 | 1.26 |
| 5/6 | 1.31 |

| | RATIOS | 456 | 458 | 450 | 452 | 454 |
|---|---|---|---|---|---|---|
| REVERSE | -1.91 | X | | | X | |
| NEUTRAL | 0 | X | | | | |
| 1 | 3.62 | X | X | | | |
| 2 | 2.45 | X | | | | X |
| 3 | 1.63 | | X | | | X |
| 4 | 1.00 | | | X | | X |
| 5 | 0.80 | | X | X | | |
| 6 | 0.59 | | X | | X | |

(X=engaged)

Ring Gear/Sun Gear Tooth Ratios: $\frac{R1}{S1}=1.91, \frac{R2}{S2}=1.58, \frac{R3}{S3}=1.53$

| Ratio Spread | 6.18 |
|---|---|
| Ratio Steps | |
| REV/1 | -0.53 |
| 1/2 | 1.48 |
| 2/3 | 1.50 |
| 3/4 | 1.63 |
| 4/5 | 1.25 |
| 5/6 | 1.36 |

|  | RATIOS | 556 | 558 | 550 | 552 | 554 |
|---|---|---|---|---|---|---|
| REVERSE | -1.87 |  | X |  | X |  |
| NEUTRAL | 0 |  | X |  |  |  |
| 1 | 3.48 | X | X |  |  |  |
| 2 | 2.40 |  | X | X |  |  |
| 3 | 1.61 | X |  | X |  |  |
| 4 | 1.00 |  |  | X |  | X |
| 5 | 0.81 | X |  |  |  | X |
| 6 | 0.61 | X |  |  | X |  |

(X=engaged)

Ring Gear/Sun Gear Tooth Ratios: $\frac{R1}{S1}=1.57, \frac{R2}{S2}=1.63, \frac{R3}{S3}=1.87$

| Ratio Spread | 5.70 |
|---|---|
| Ratio Steps |  |
| REV/1 | -0.54 |
| 1/2 | 1.45 |
| 2/3 | 1.49 |
| 3/4 | 1.61 |
| 4/5 | 1.24 |
| 5/6 | 1.32 |

| | RATIOS | 656 | 658 | 650 | 652 | 654 |
|---|---|---|---|---|---|---|
| REVERSE | -2.81 | X | | | X | |
| NEUTRAL | 0 | X | | | | |
| 1 | 5.58 | X | | | | X |
| 2 | 3.82 | X | X | | | |
| 3 | 2.53 | | X | | | X |
| 4 | 1.59 | | X | | X | |
| 5 | 1.30 | | X | X | | |
| 6 | 1.00 | | | X | X | |

(X=engaged)

Ring Gear/Sun Gear Tooth Ratios: $\frac{R1}{S1}=2.81, \frac{R2}{S2}=1.53, \frac{R3}{S3}=1.60$

| Ratio Spread | 5.58 |
|---|---|
| Ratio Steps | |
| REV/1 | -0.50 |
| 1/2 | 1.46 |
| 2/3 | 1.51 |
| 3/4 | 1.59 |
| 4/5 | 1.22 |
| 5/6 | 1.30 |

| | RATIOS | 756 | 758 | 750 | 752 | 754 |
|---|---|---|---|---|---|---|
| REVERSE | -2.98 | | X | | | X |
| NEUTRAL | 0 | | X | | | |
| 1 | 5.94 | | X | X | | |
| 2 | 4.13 | X | X | | | |
| 3 | 2.65 | X | | X | | |
| 4 | 1.58 | X | | | | X |
| 5 | 1.28 | X | | | X | |
| 6 | 1.00 | | | | X | X |

( X=engaged)

Ring Gear/Sun Gear Tooth Ratios: $\frac{R1}{S1}=1.65, \frac{R2}{S2}=1.83, \frac{R3}{S3}=2.98$

| Ratio Spread | 5.94 |
|---|---|
| Ratio Steps | |
| REV/1 | -0.50 |
| 1/2 | 1.44 |
| 2/3 | 1.56 |
| 3/4 | 1.68 |
| 4/5 | 1.24 |
| 5/6 | 1.28 |

| | RATIOS | 856 | 858 | 850 | 852 | 854 |
|---|---|---|---|---|---|---|
| REVERSE | -6.73 | X | | X | | |
| NEUTRAL | 0 | X | | | | |
| 1 | 7.67 | X | | | | X |
| 2 | 4.00 | X | X | | | |
| 3 | 2.32 | | X | | | X |
| 4 | 1.71 | | X | X | | |
| 5 | 1.29 | | X | | X | |
| 6 | 1.00 | | | X | X | |

(X=engaged)

Ring Gear/Sun Gear Tooth Ratios: $\frac{R1}{S1} = 2.33, \frac{R2}{S2} = 3.00, \frac{R3}{S3} = 1.88$

| Ratio Spread | 7.67 |
|---|---|
| Ratio Steps | |
| REV/1 | -0.88 |
| 1/2 | 1.92 |
| 2/3 | 1.73 |
| 3/4 | 1.36 |
| 4/5 | 1.32 |
| 5/6 | 1.29 |

| | RATIOS | 956 | 958 | 950 | 952 | 954 |
|---|---|---|---|---|---|---|
| REVERSE | -3.48 | | X | | | X |
| NEUTRAL | 0 | | X | | | |
| 1 | 5.99 | | X | X | | |
| 2 | 3.88 | X | X | | | |
| 3 | 2.28 | X | | X | | |
| 4 | 1.49 | X | | | | X |
| 5 | 1.23 | X | | | X | |
| 6 | 1.00 | | | | X | X |

(X=engaged)

Ring Gear/Sun Gear Tooth Ratios: $\frac{R1}{S1}=2.91, \frac{R2}{S2}=2.03, \frac{R3}{S3}=1.60$

| Ratio Spread | 5.99 |
|---|---|
| Ratio Steps | |
| REV/1 | -0.58 |
| 1/2 | 1.55 |
| 2/3 | 1.70 |
| 3/4 | 1.53 |
| 4/5 | 1.21 |
| 5/6 | 1.23 |

|   | RATIOS | 1056 | 1058 | 1050 | 1052 | 1054 |
|---|---|---|---|---|---|---|
| REVERSE | -1.91 | X |  |  | X |  |
| NEUTRAL | 0 | X |  |  |  |  |
| 1 | 3.62 | X | X |  |  |  |
| 2 | 2.45 | X |  |  |  | X |
| 3 | 1.63 |  | X |  |  | X |
| 4 | 1.00 |  |  | X |  | X |
| 5 | 0.80 |  | X | X |  |  |
| 6 | 0.59 |  | X |  | X |  |

( X = engaged )

Ring Gear/Sun Gear Tooth Ratios: $\frac{R1}{S1}=1.91, \frac{R2}{S2}=1.58, \frac{R3}{S3}=2.53$

| Ratio Spread | 6.18 |
|---|---|
| Ratio Steps |  |
| REV/1 | -0.53 |
| 1/2 | 1.48 |
| 2/3 | 1.50 |
| 3/4 | 1.63 |
| 4/5 | 1.25 |
| 5/6 | 1.36 |

| | RATIOS | 1156 | 1158 | 1150 | 1152 | 1154 |
|---|---|---|---|---|---|---|
| REVERSE | -3.72 | | X | X | | |
| NEUTRAL | 0 | | X | | | |
| 1 | 4.56 | X | X | | | |
| 2 | 2.61 | X | | X | | |
| 3 | 1.86 | X | | | X | |
| 4 | 1.34 | X | | | | X |
| 5 | 1.00 | | | | X | X |
| 6 | 0.72 | | X | | | X |

(X=engaged)

Ring Gear/Sun Gear Tooth Ratios: $\frac{R1}{S1}=2.54, \frac{R2}{S2}=2.93, \frac{R3}{S3}=2.40$

| Ratio Spread | 6.34 |
|---|---|
| Ratio Steps | |
| REV/1 | -0.82 |
| 1/2 | 1.75 |
| 2/3 | 1.40 |
| 3/4 | 1.39 |
| 4/5 | 1.34 |
| 5/6 | 1.39 |

US 6,780,138 B2

FAMILY OF MULTI-SPEED PLANETARY TRANSMISSION MECHANISMS HAVING THREE PLANETARY GEARSETS, THREE CLUTCHES, AND TWO BRAKES

TECHNICAL FIELD

This invention relates to planetary transmissions and, more particularly, to a family of multi-speed planetary transmissions having three planetary gearsets.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 5,106,352 issued to Lepelletier on Apr. 21, 1992; U.S. Pat. No. 5,542,889 issued to Pierce et al. on Aug. 6, 1996; U.S. Pat. No. 5,599,251 issued to Beim and McCarrick on Feb. 4, 1997; U.S. Pat. No. 6,071,208 issued to Koivunen on Jun. 6, 2000; U.S. Pat. No. 6,083,135 issued to Baldwin et al. on Jul. 4, 2000; and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of this invention to provide an improved family of multi-speed transmissions having three planetary gearsets.

In one aspect of the present invention, each of the planetary gearsets has three members comprised of a sun gear member, a ring gear member, and a planet carrier assembly member.

In another aspect of the present invention, each of the planet carrier assembly members can be either of a single pinion or double pinion type planetary.

In still another aspect of the present invention, each transmission family member includes five torque-transmitting mechanisms comprised of three clutches and two brakes.

In yet another aspect of the present invention, the first member of the first planetary gearset is continuously interconnected with a first member of the second planetary gearset through an interconnecting member.

In a still another aspect of the present invention, the second member of the first planetary gearset is continuously interconnected with a first member of the third planetary gearset through a second interconnecting member.

In yet still another aspect of the present invention, the second member of the second planetary gearset is continuously interconnected with a second member of the third planetary gearset through a third interconnecting member.

In a further aspect of the present invention, a transmission input shaft is connected with at least one member of one of the planetary gearsets, and a transmission output shaft is continuously connected with another member of one of the planetary gearsets.

In yet a further aspect of the present invention, a first of the brake members is selectively engageable to connect a member of one of the planetary gearsets with a stationary transmission housing.

In a still further aspect of the present invention, the second of the brake members is selectively engageable to connect a member of one of the planetary gearsets or one of the interconnecting members with the stationary transmission housing.

In yet still a further aspect of the present invention, the first and second of the clutch members are individually selectively engageable to connect at least one member of one of the planetary gearsets with either the input shaft, the output shaft, or another member of one of the planetary gearsets.

In a further aspect of the present invention, the third of the clutch members is selectively engageable to connect a member of one of the planetary gearsets with a member of another of the planetary gearsets.

In another aspect of the present invention, the selectively engageable torque-transmitting mechanisms are engaged in combinations of two to establish at least six forward speed ratios and one reverse speed ratio in the planetary gearsets between the input shaft and the output shaft.

DESCRIPTION EXEMPLARY EMBODIMENTS

Figures 1, 2:
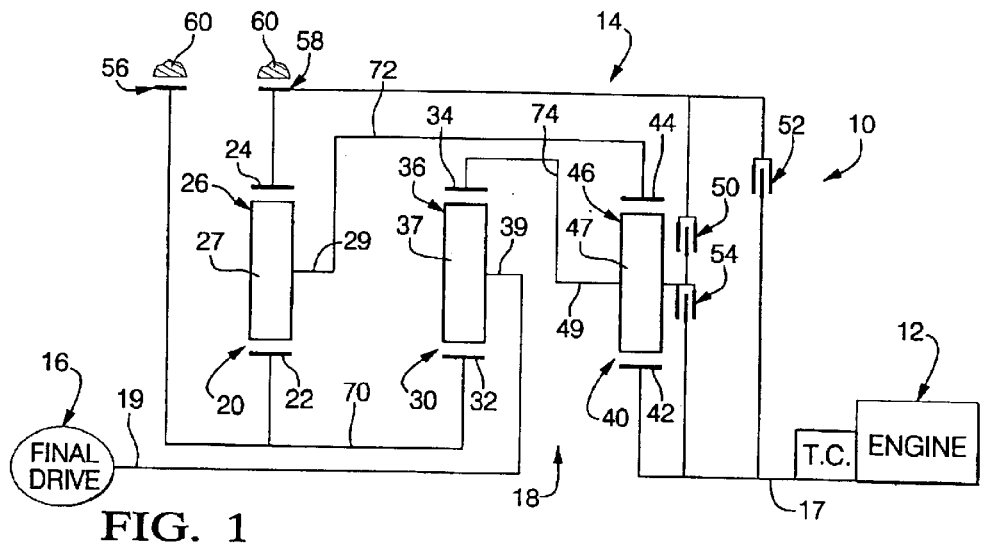
FIG. 1 is a schematic representation of a powertrain having a planetary transmission incorporating one family member of the present invention.
FIG. 2 is a truth table and chart providing some of the operating characteristics of the family member shown in FIG. 1.

Referring to the drawings, wherein like characters represent the same or corresponding parts throughout the several views, there is seen in FIG. 1 a powertrain 10 including a conventional engine and torque converter 12, a planetary transmission 14, and a conventional final drive mechanism 16. The planetary transmission 14 includes an input shaft 17, a planetary gear arrangement 18, and an output shaft 19. The planetary gear arrangement 18 includes three planetary gearsets 20, 30, and 40, and five torque-transmitting mechanisms 50, 52, 54, 56, and 58. The torque-transmitting mechanisms 50, 52, and 54 are rotating type torque-transmitting mechanisms, commonly termed clutches, and the torque-transmitting mechanisms 56 and 58 are stationary type torque-transmitting mechanisms, commonly termed brakes.

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier 49 and disposed in meshing relationship with both the sun gear member 42 and the ring gear member 44.

Each of the planetary gearsets 20, 30, and 40 schematically show only a single pinion gear, however, as is well known pinion gears are equiangularly spaced on their respective planet carriers to provide sufficient torque capacity as required by each of the planetary gearsets. The planetary gearsets 20, 30, and 40 are simple planetary gearsets, that is, a single pinion meshes between the sun gear member and ring gear member in each of the planetary gearsets.

The sun gear member 22 and sun gear member 32 are continuously interconnected by an interconnecting member 70 which is selectively connectible with the transmission housing 60 through the torque-transmitting mechanism 56. The planet carrier assembly member 26 and the ring gear member 44 are continuously interconnected by an interconnecting member 72. The ring gear member 34 and planet carrier assembly member 46 are continuously interconnected through an interconnecting member 74 which is selectively connectible with the input shaft 17 through the torque-transmitting mechanism 54, and selectively connectible with the ring gear member 24 through the torque-transmitting mechanism 50. The input shaft 17 is continuously connected with the sun gear member 42, and selectively connectible with the ring gear member 24 through the torque-transmitting mechanism 52. The output shaft 19 is continuously connected with the planet carrier assembly member 36. The ring gear member 24 is selectively connectible with the transmission housing 60 through the torque-transmitting mechanism 58. It should be noted that the ring gear member 24 is not continuously connected with any of the members of the planetary gearsets except through the respective torque-transmitting mechanisms.

The truth table in FIG. 2 provides a representation of the combination of engagements and sequence of engagements for the torque-transmitting mechanisms in order to establish six forward speed ratios and one reverse speed ratio in the planetary gear arrangement 18 between the input shaft 17 and the output shaft 19. As noted in the truth table, the torque-transmitting mechanisms are engaged in combinations of two for each of the speed ratios. The truth table also provides a numerical example of speed ratios that are possible with the planetary gear arrangement 18 when the planetary gearsets 20, 30, and 40 have ring gear/sun gear tooth ratios shown as R1/S1, R2/S2, and R3/S3, respectively. Also shown in FIG. 2 is a chart of the ratio steps between adjacent forward speed ratios as well as between the reverse and forward speed ratio when the example ring gear/sun gear tooth ratios are employed in the planetary gear arrangement 18. Those skilled in the art will recognize that each of the single step forward interchanges is of the single transition variety as well as the double step forward interchanges.

The reverse speed ratio is established with the engagement of the torque-transmitting mechanisms 50 and 58. During the reverse speed ratio, the ring gear member 44 and planet carrier assembly member 26 are rotated at a speed determined by the speed of the sun gear member 42 and the ring gear/sun gear tooth ratio of the planetary gearset 40. The sun gear members 22 and 32 are rotated at a speed determined by the speed of the planet carrier assembly member 26 and ring gear/sun gear tooth ratio of the planetary gearset 20. The planet carrier assembly member 36 and therefore output shaft 19 are rotated at a speed determined by the speed of the sun gear member 32 and the ring gear/sun gear tooth ratio of the planetary gearset 30. The numerical value of the reverse speed ratio is determined by the ring gear/sun gear tooth ratios of all three planetary gearsets 20, 30, and 40.

The first forward speed ratio is established with the engagement of the torque-transmitting mechanisms 56 and 58. During the first forward speed ratio, the planet carrier assembly member 46 and ring gear member 34 are rotated at a speed determined by the speed of the sun gear member 42 and the ring gear/sun gear tooth ratio of the planetary gearset 40. The speed of the planet carrier assembly member 36 and therefore output shaft 19 are determined by the speed of the ring gear member 34 and the ring gear/sun gear tooth ratio of the planetary gearset 30. The numerical value of the first forward speed ratio is determined by the ring gear/sun gear tooth ratios of the planetary gearsets 30 and 40.

The second forward speed ratio is established with the engagement of the torque-transmitting mechanisms 50 and 56. During the second forward speed ratio, the ring gear member 24, ring gear member 34, and planet carrier assembly member 46 are rotated at a speed determined by the speed of the planet carrier assembly member 26 and the ring gear/sun gear tooth ratio of the planetary gearset 20. The planet carrier assembly member 46, ring gear member 34, and ring gear member 24 are rotated at a speed determined by the speed of the sun gear member 42, the speed of the ring gear member 44, and the ring gear/sun gear tooth ratio of the planetary gearset 40. The planet carrier assembly member 36 is rotated at a speed determined by the speed of the ring gear member 34 and the ring gear/sun gear tooth ratio of the planetary gearset 30. The numerical value of the second forward speed ratio is determined by the ring gear/sun gear tooth ratios of all three planetary gearsets 20, 30, and 40.

The third forward speed ratio is established with the engagement of the torque-transmitting mechanisms 52 and 56. During the third forward speed ratio, the ring gear member 24 is driven by the input shaft 17. The planet carrier assembly member 26 and ring gear member 44 are rotated at a speed determined by the speed of the ring gear member 24 and the ring gear/sun gear tooth ratio of the planetary gearset 20. The planet carrier assembly member 46 and ring gear member 34 are rotated at a speed determined by the speed of the sun gear member 42, the speed of the ring gear member 44, and the ring gear/sun gear tooth ratio of the planetary gearset 40. The planet carrier assembly member 36 and therefore output shaft 19 are rotated at a speed determined by the speed of the ring gear member 34 and the ring gear/sun gear tooth ratio of the planetary gearset 30. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 54 and 56. During the fourth forward speed ratio, the ring gear member 34 is driven by the input shaft 17. The planet carrier assembly member 36 and therefore output shaft 19 are rotated at a speed determined by the speed of the ring gear member 34 and the ring gear/sun gear tooth ratio of the planetary gearset 30. The numerical value of the fourth forward speed ratio is determined by the ring gear/sun gear tooth ratio of the planetary gearset 30.

The fifth forward speed ratio is established with the engagement of the torque-transmitting mechanisms 52 and 54. During the fifth forward speed ratio, the planetary gearsets 20, 30, and 40 are rotated in unison with the input shaft 17 and the output shaft 19. The fifth forward speed ratio is a direct drive having a numerical value of one.

The sixth forward speed ratio is established with the engagement of the torque-transmitting mechanisms 54 and 58. During the sixth forward speed ratio, the sun gear members 22 and 32 are rotated at a speed determined by the speed of the planet carrier assembly member 26 and the ring gear/sun gear tooth ratio of the planetary gearset 20. The planet carrier assembly member 36 and therefore output shaft 19 are rotated at a speed determined by the speed of the ring gear member 34, the speed of the sun gear member 32, and the ring gear/sun gear tooth ratio of the planetary gearset 30. The numerical value of the sixth forward speed ratio is determined by the ring gear/sun gear tooth ratios of the planetary gearsets 20 and 30. It should be noted that during the sixth forward speed ratio the planetary gearset 40 as well as the planet carrier assembly member 26 and the ring gear 34 are all rotating at the speed of the input shaft 17.

Figures 3, 4:
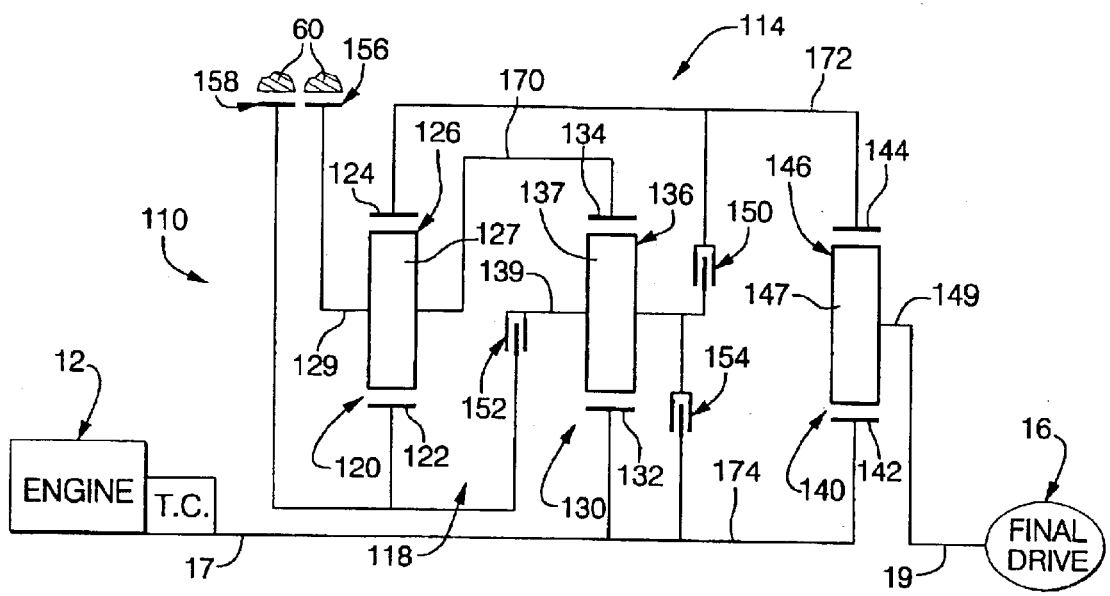
FIG. 3 is a schematic representation of a powertrain having a planetary transmission incorporating another family member of the present invention.
FIG. 4 is a truth table and chart providing some of the operating characteristics of the family member shown in FIG. 3.

A powertrain 110, shown in FIG. 3 includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158. The torque-transmitting mechanisms 150, 152, and 154 are rotating type torque-transmitting mechanisms, and the torque-transmitting mechanisms 156 and 158 are stationary type torque-transmitting mechanisms, commonly termed brakes.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with both the sun gear member 142 and the ring gear member 144.

The planet carrier assembly member 126 and the ring gear member 134 are continuously interconnected by an interconnecting member 170 that is selectively connectible with the transmission housing 60 through the torque-transmitting mechanism 156. The ring gear member 124 and ring gear member 144 are continuously interconnected by an interconnecting member 172 that is selectively connectible with planet carrier assembly member 136 through the torque-transmitting mechanism 150. The sun gear member 132 and sun gear member 142 are continuously interconnected by an interconnecting member 174, which is continuously connected with the input shaft 17. The output shaft 19 is continuously connected with the planet carrier assembly member 146. The interconnecting member 174 is selectively connectible with the planet carrier assembly member 136 through the torque-transmitting mechanism 154. The sun gear member 122 is selectively connectible with the planet carrier assembly member 136 through the torque-transmitting mechanism 152, and selectively connectible with transmission housing 60 through the torque-transmitting mechanism 158. The sun gear member 122 and planet carrier assembly member 136 are noncontinuously connected with other members of the planetary gearsets except through the respective torque-transmitting mechanisms.

The torque-transmitting mechanisms are engaged in combinations of two, as seen in the truth table of FIG. 4, which also provides the engagement combinations and sequence for establishing six forward speed ratios and one reverse speed ratio in the planetary gear arrangement 118 between the input shaft 17 and the output shaft 19. Also given in the truth table is a numerical example of the speed ratios that are available with the planetary gear arrangement 118 when the ring gear/sun gear tooth ratios of the planetary gearsets 120, 130, and 140 are equal to R1/S1, R2/S2, and R3/S3, respectively. Also given in the chart of FIG. 4 is a numerical example of the ratio steps between adjacent forward speed ratios as well as between the reverse and first forward speed ratio when the given speed ratios are employed. It will be noted that each of the single step forward interchanges as well as the double step forward interchanges are of the single transition variety.

The reverse speed ratio is established with the engagement of the torque-transmitting mechanisms 152 and 158. During the reverse speed ratio, the ring gear member 134 and planet carrier assembly member 126 are rotated at a speed determined by the speed of the sun gear member 132 and the ring gear/sun gear tooth ratio of the planetary gearset 130. The ring gear member 124 and ring gear member 144 are rotated at a speed determined by the speed of the planet carrier assembly member 126 and the ring gear/sun gear tooth ratio of the planetary gearset 120. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the reverse speed ratio is determined by the ring gear/sun gear tooth ratios of all three planetary gearsets 120, 130, and 140.

The first forward speed ratio is established with the engagement of the torque-transmitting mechanisms 152 and 156. During the first forward speed ratio, the planet carrier assembly member 136 and sun gear member 122 are rotated at a speed determined by the speed of the sun gear member 132 and the ring gear/sun gear tooth ratio of the planetary gearset 130. The ring gear members 124 and 144 are rotated at a speed determined by the speed of the sun gear member 122 and the ring gear/sun gear tooth ratio of the planetary gearset 120. The planet carrier assembly member 146 and therefore output shaft 19 are rotated at a speed determined by the speed of the ring gear member 144, the speed of the sun gear member 142, and the ring gear/sun gear tooth ratio of the planetary gearset 140. The numerical value of the first forward speed ratio is determined by the ring gear/sun gear tooth ratios of all three planetary gearsets 120, 130, and 140.

The second forward speed ratio is established with the engagement of the torque-transmitting mechanisms 156 and 158. During the second forward speed ratio, the ring gear member 144 is held stationary. The planet carrier assembly member 146 and therefore the output shaft 19 are rotated at a speed determined by the speed of the sun gear member 142 and the ring gear/sun gear tooth ratio of the planetary gearset 140. The numerical value of the second forward speed ratio is determined by the ring gear/sun gear tooth ratio of the planetary gearset 140.

The third forward speed ratio is established with the engagement of the torque-transmitting mechanisms 150 and 156. During the third forward speed ratio, the planet carrier assembly member 136 and ring gear member 144 are rotated at a speed determined by the speed of the sun gear member 132 and the ring gear/sun gear tooth ratio of the planetary gearset 130. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the third forward speed ratio is determined by the ring gear/sun gear tooth ratios of the planetary gearsets 130 and 140.

The fourth forward speed ratio is established with the engagement of the torque-transmitting mechanisms 150 and 158. During the fourth forward speed ratio, the ring gear member 134 and planet carrier assembly member 126 are rotated at a speed determined by the speed of the sun gear member 122, the speed of the planet carrier assembly member 136, and the ring gear/sun gear tooth ratio of the planetary gearset 130. The ring gear member 124, ring gear member 144, and planet carrier assembly member 136 are rotated at a speed determined by the speed of the planet carrier assembly member 126 and the ring gear/sun gear tooth ratio of the planetary gearset 120. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150 and 154. During the fifth forward speed ratio, the planetary gearsets 120, 130, and 140 are rotated in unison with the input shaft 17 and the output shaft 19, thereby providing a direct drive in the planetary gear arrangement 118 having a numerical value of one.

The sixth forward speed ratio is established with the engagement of the torque-transmitting mechanisms 154 and 158. During the sixth forward speed ratio, the planet carrier assembly member 126 is rotated at the speed of the input shaft 17. The ring gear members 124 and 144 are rotated at a speed determined by the speed of the planet carrier assembly member 126 and the ring gear/sun gear tooth ratio of the planetary gearset 120. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the sixth forward speed ratio is determined by the ring gear/sun gear tooth ratio of the planetary gearsets 120 and 140.

Figures 5, 6:
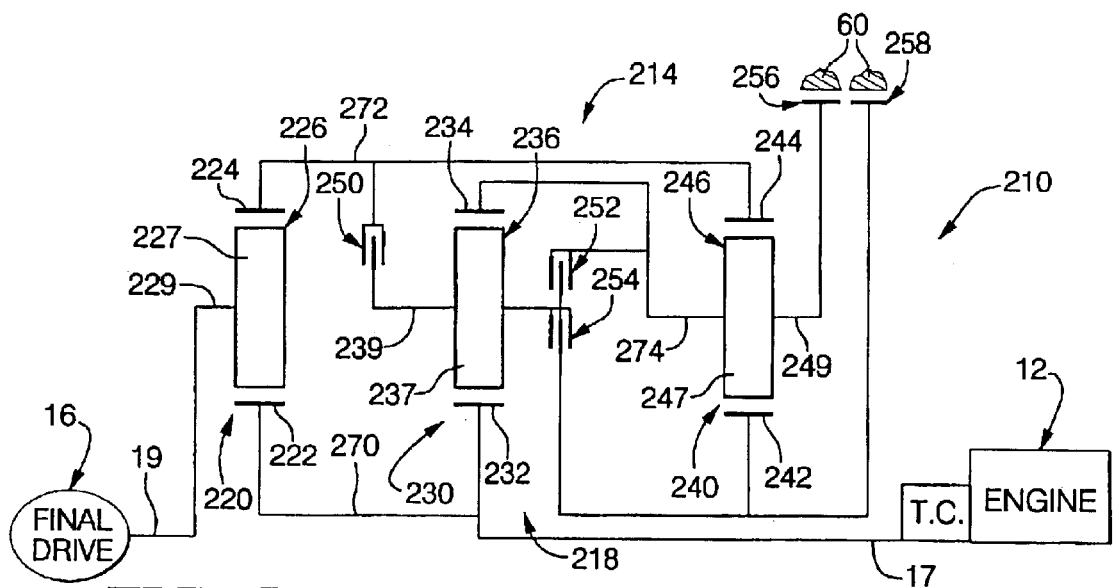
FIG. 5 is a schematic representation of a powertrain having a planetary transmission incorporating another family member of the present invention.
FIG. 6 is a truth table and chart providing some of the operating characteristics of the family member shown in FIG. 5.

A powertrain 210, shown in FIG. 5 includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, three rotating type torque-transmitting mechanisms 250, 252, and 254, and two stationary type torque-transmitting mechanisms 256, and 258.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249 and disposed in meshing relationship with both the sun gear member 242 and the ring gear member 244.

The sun gear members 222 and 232 are continuously interconnected by an interconnecting member 270 that is continuously connected with the input shaft 17. The ring gear members 224 and 244 are continuously interconnected by an interconnecting member 272 that is selectively connectible with the planet carrier assembly member 236 through the torque-transmitting mechanism 250. The ring gear member 234 and planet carrier assembly member 246 are continuously interconnected through an interconnecting member 274 that is selectively connectible with the planet carrier assembly member 236 through the torque-transmitting mechanism 252, and selectively connectible with a transmission housing 60 through the torque-transmitting mechanism 256. The sun gear member 242 is selectively connectible with the planet carrier assembly member 236 through the torque-transmitting mechanism 254, and selectively connectible with the transmission housing 60 through the torque-transmitting mechanism 258. It should be noted that the engagement of the torque-transmitting mechanism 252 will cause the planetary gearset 230 to rotate as a single unit. The planet carrier assembly member 226 is continuously connected with the output shaft 19.

The torque-transmitting mechanisms are engaged, as seen in FIG. 6, in combinations of two to establish six forward speed ratios and one reverse speed ratio in the planetary gear arrangement 218. The truth table of FIG. 6 describes the sequence of engagements, which will produce the speed ratios. Also given in the truth table is a numerical example of the speed ratios available with the planetary gear arrangement 218 when the ring gear/sun gear tooth ratios of the planetary gearsets 220, 230, and 240 are equal to the ratios R1/S1, R2/S2, and R3/S3, respectively. The chart of FIG. 6 provides a numerical example of the ratio steps between adjacent forward speed ratios as well as between the reverse and first forward speed ratio when the speed ratios given in the truth table are employed. It will be noted that each of the single step forward interchanges as well as the double step forward interchanges are of the single transition variety.

The reverse speed ratio is established with the engagement of the torque-transmitting mechanisms 254 and 258. During the reverse speed ratio, the ring gear member 234 and planet carrier assembly member 246 are rotated at a speed determined by the speed of the sun gear member 232 and the ring gear/sun gear tooth ratio of the planetary gearset 230. The ring gear members 244 and 224 are rotated at a speed determined by the speed of the planet carrier assembly member 246 and the ring gear/sun gear tooth ratio of the planetary gearset 240. The planet carrier assembly member 226 and therefore output shaft 19 are rotated at a speed determined by the speed of the ring gear member 224, the speed of the sun gear member 222, and the ring gear/sun gear tooth ratio of the planetary gearset 220. The numerical value of the reverse speed ratio is determined by the ring gear/sun gear tooth ratios of the planetary gearsets 220, 230, and 240.

The first forward speed ratio is established with the engagement of the torque-transmitting mechanisms 254 and 256. During the first forward speed ratio, the planet carrier assembly member 236 and the sun gear member 242 are rotated at a speed determined by the speed of the sun gear member 232 and the ring gear/sun gear tooth ratio of the planetary gearset 230. The ring gear members 244 and 224 are rotated at a speed determined by the speed of the sun gear member 242 and the ring gear/sun gear tooth ratio of the planetary gearset 240. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the first forward speed ratio is determined by the ring gear/sun gear tooth ratios of all three planetary gearsets 220, 230, and 240.

The second forward speed ratio is established with the engagement of the torque-transmitting mechanisms 256 and 258. During the second forward speed ratio, the planet carrier assembly member 226 and therefore output shaft 19 are rotated at a speed determined by the speed of the sun gear member 222 and the ring gear/sun gear tooth ratio of the planetary gearset 220. The numerical value of the second forward speed ratio is determined by the ring gear/sun gear tooth ratio of the planetary gearset 220.

The third forward speed ratio is established with the engagement of the torque-transmitting mechanisms 250 and 256. During the third forward speed ratio, the planet carrier assembly member 236 and ring gear member 224 are rotated at a speed determined by the speed of the sun gear member 232 and the ring gear/sun gear tooth ratio of the planetary gearset 230. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the third forward speed ratio is determined by the ring gear/sun gear tooth ratios of the planetary gearsets 220 and 230.

The fourth forward speed ratio is established with the engagement of the torque-transmitting mechanisms 250 and 258. During the fourth forward speed ratio, the ring gear member 234 and planet carrier assembly member 246 are rotated at a speed determined by the speed of the sun gear member 232, the speed of the planet carrier assembly member 236, and the ring gear/sun gear tooth ratio of the planetary gearset 230. The ring gear members 244 and 224 are rotated at a speed determined by the speed of the planet carrier assembly member 246 and the ring gear/sun gear tooth ratio of the planetary gearset 240. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250 and 252. During the fifth forward speed ratio, the planetary gearsets 220, 230, and 240 are rotated in unison with the input shaft 17 and the output shaft 19 to establish a direct drive through the planetary gear arrangement 218 having a numerical value of one.

The sixth forward speed ratio is established with the engagement of the torque-transmitting mechanisms 252 and 258. During the sixth forward speed ratio, the ring gear members 244 and 224 are rotated at a speed determined by the speed of the planet carrier assembly member 246 and the ring gear/sun gear tooth ratio of the planetary gearset 240. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the sixth forward speed ratio is determined by the ring gear/sun gear tooth ratios of the planetary gearsets 220 and 240.

Figures 7, 8:
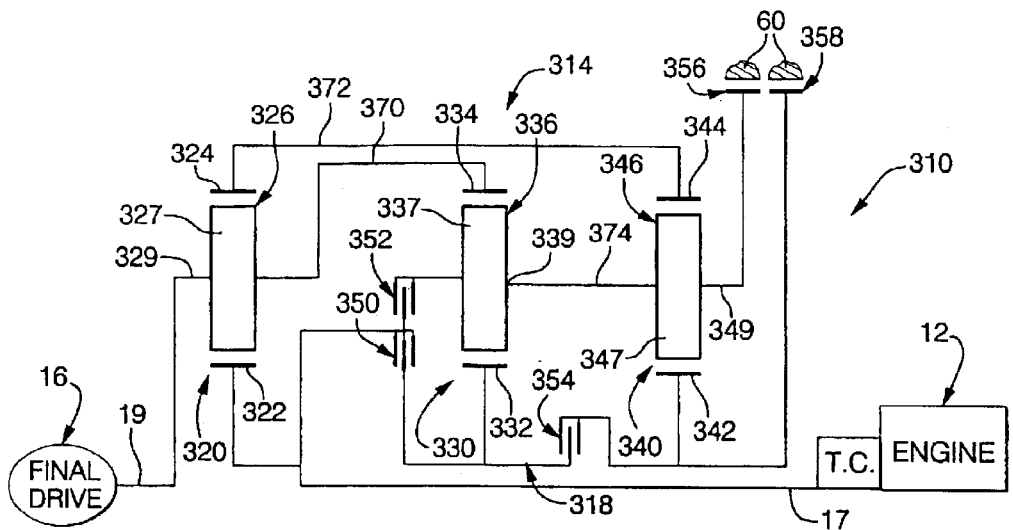
FIG. 7 is a schematic representation of a powertrain having a planetary transmission incorporating another family member of the present invention.
FIG. 8 is a truth table and chart providing some of the operating characteristics of the family member shown in FIG. 7.

A powertrain 310, shown in FIG. 7 includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, three rotating type torque-transmitting mechanisms 350, 352, and 354, and two stationary type torque-transmitting mechanisms 356, and 358.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349 and disposed in meshing relationship with both the sun gear member 342 and the ring gear member 344.

The planet carrier assembly member 326 and ring gear member 334 are continuously interconnected by an interconnecting member 370, which is continuously connected with the output shaft 19. The ring gear members 324 and 344 are continuously interconnected by an interconnecting member 372. The planet carrier assembly members 336 and 346 are continuously interconnected by an interconnecting member 374, which is selectively connectible with the input shaft 17 through the torque-transmitting mechanism 352, and selectively connectible with the transmission housing 60 through the torque-transmitting mechanism 356. The sun gear member 342 is selectively connectible with the sun gear member 332 through the torque-transmitting mechanism 354, and with the transmission housing 60 through the torque-transmitting mechanism 358. The sun gear member 332 is selectively connectible with the input shaft 17 through the torque-transmitting mechanism 350. The input shaft 17 is continuously connected with the sun gear member 322. The sun gear members 332 and 342 are noncontinuously interconnected with any of the other members of the planetary gear arrangement 318 except by way of the respective torque-transmitting mechanisms.

The torque-transmitting mechanisms are engaged of combinations of two, as seen in the truth table of FIG. 8. The truth table also provides the sequence of engagements for the torque-transmitting mechanisms in order to establish six forward speed ratios and one reverse speed ratio between the input shaft 17 and the output shaft 19 through the planetary gear arrangement 318. Each of the single step forward interchanges as well as the double step forward interchanges, except the $4^{th}$ to $6^{th}$ step, are of the single transition variety. Also given in the truth table is a numerical example of the speed ratios that are available with the planetary gear arrangement 318 when the ring gear/sun gear tooth ratios of the planetary gearsets 320, 330, and 340 are provided as given in R1/S1, R2/S2, and R3/S3, respectively. The chart in FIG. 8 provides a numerical example of the ratio steps between adjacent forward speed ratios as well as between the reverse and first forward speed ratio when the given speed ratios are employed.

The reverse speed ratio is established with the engagement of the torque-transmitting mechanisms 350 and 356. During the reverse speed ratio, the ring gear member 334 and therefore output shaft 19 are rotated at a speed determined by the speed of the sun gear member 332 and the ring gear/sun gear tooth ratio of the planetary gearset 330. The numerical value of the reverse speed ratio is determined by the ring gear/sun gear tooth ratio of the planetary gearset 330.

The first forward speed ratio is established with the engagement of the torque-transmitting mechanisms 356 and 358. During the first forward speed ratio, the ring gear member 324 is held stationary. The planet carrier assembly member 326 and therefore output shaft 19 are rotated at a speed determined by the speed of the sun gear member 322 and the ring gear/sun gear tooth ratio of the planetary gearset 320. The numerical value of the first forward speed ratio is determined by the ring gear/sun gear tooth ratio of the planetary gearset 320.

The second forward speed ratio is established with the engagement of the torque-transmitting mechanisms 354 and 356. During the second forward speed ratio, the ring gear members 324 and 344 are rotated at a speed determined by the speed of the sun gear member 322, the speed of the planet carrier assembly member 326, and the ring gear/sun gear tooth ratio of the planetary gearset 320. The sun gear members 342 and 332 are rotated at a speed determined by the speed of the ring gear member 344 and the ring gear/sun gear tooth ratio of the planetary gearset 340. The ring gear member 334, planet carrier assembly member 326, and output shaft 19 are rotated at a speed determined by the speed of the sun gear member 332 and the ring gear/sun gear tooth ratio of the planetary gearset 330. The numerical value of the second forward speed ratio is determined by the ring gear/sun gear tooth ratios of all three planetary gearsets 320, 330, and 340.

The third forward speed ratio is established with the engagement of the torque-transmitting mechanisms 354 and 358. During the third forward speed ratio, the ring gear members 324 and 344 are rotated at a speed determined by the speed of the sun gear member 322, the speed of the planet carrier assembly member 326, and the ring gear/sun gear tooth ratio of the planetary gearset 320. The planet carrier assembly members 336 and 346 are rotated at a speed determined by the speed of the ring gear member 344 and the ring gear/sun gear tooth ratio of the planetary gearset 340. The ring gear member 334, planet carrier assembly member 326, and output shaft 19 are rotated at a speed determined by the speed of the planet carrier assembly member 336 and the ring gear/sun gear tooth ratio of the planetary gearset 330. The numerical value of the third forward speed ratio is determined by the ring gear/sun gear tooth ratios of all three planetary gearsets 320, 330, and 340.

The fourth forward speed ratio is established with the engagement of the torque-transmitting mechanisms 352 and 354. During the fourth forward speed ratio, the planetary gearsets 320, 330, and 340 are rotated in unison with the input shaft 17 and the output shaft 19 to establish a 1:1 drive ratio having a numerical value of one.

The fifth forward speed ratio is established with the engagement of the torque-transmitting mechanisms 352 and 358. During the fifth forward speed ratio, the ring gear members 344 and 324 are rotated at a speed determined by the speed of the planet carrier assembly member 346 and the ring gear/sun gear tooth ratio of the planetary gearset 340. The planet carrier assembly member 326 and output shaft 19 are rotated at a speed determined by the speed of the ring gear member 324, the speed of the sun gear member 322, and the ring gear/sun gear tooth ratio of the planetary gearset 320. The numerical value of the fifth forward speed ratio is determined by the ring gear/sun gear tooth ratios of the planetary gearsets 320 and 340.

The sixth forward speed ratio is established with the engagement of the torque-transmitting mechanisms 350 and 358. During the sixth forward speed ratio, the planet carrier assembly members 336 and 346 are rotated at a speed determined by the speed of the sun gear member 332, the speed of the ring gear member 334, and the ring gear/sun gear tooth ratio of the planetary gearset 330. The ring gear members 344 and 324 are rotated at a speed determined by the speed of the planet carrier assembly member 346 and the ring gear/sun gear tooth ratio of the planetary gearset 340. The planet carrier assembly member 326 and output shaft 19 are rotated at a speed determined by the speed of the sun gear member 322, the speed of the ring gear member 324, and the ring gear/sun gear tooth ratio of the planetary gearset 320. The numerical value of the sixth forward speed ratio is determined by the ring gear/sun gear tooth ratios of the all three planetary gearsets 320, 330, and 340.

Figures 9, 10:
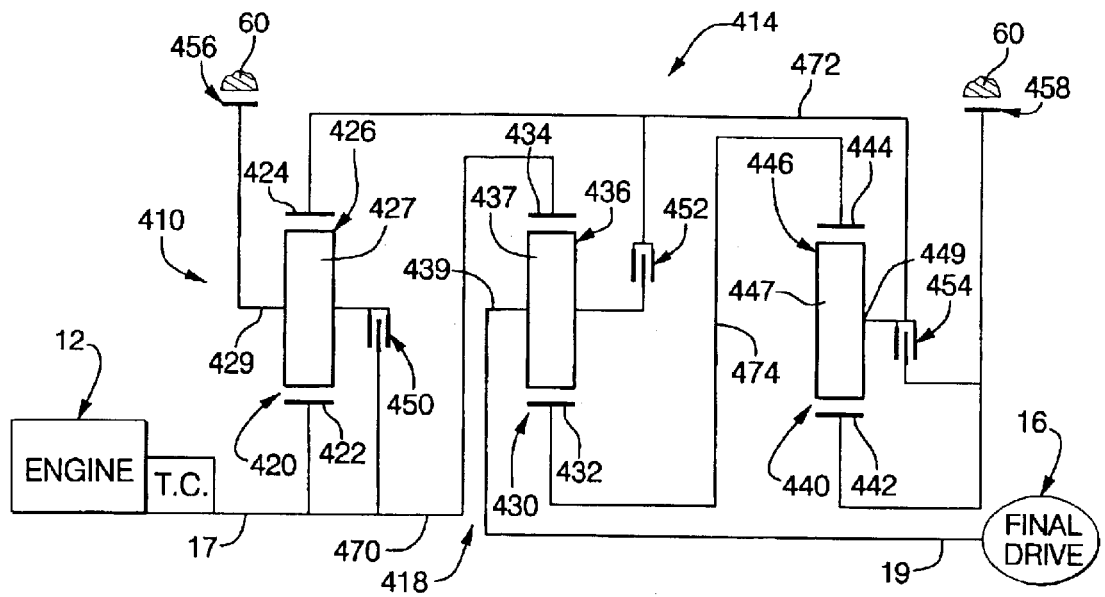
FIG. 9 is a schematic representation of a powertrain having a planetary transmission incorporating another family member of the present invention.
FIG. 10 is a truth table and chart providing some of the operating characteristics of the family member shown in FIG. 9.

A powertrain 410, shown in FIG. 9 includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, three rotating type torque-transmitting mechanisms 450, 452, and 454, and two stationary type torque-transmitting mechanisms 456, and 458.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with both the sun gear member 442 and the ring gear member 444.

The sun gear member 422 and ring gear member 434 are continuously interconnected by an interconnecting member 470, which is also continuously connected with the input shaft 17. The ring gear member 424 and planet carrier assembly member 446 are continuously interconnected by an interconnecting member 472, which is also selectively connectible with the sun gear member 442 through the torque-transmitting mechanism 454. The sun gear member 432 and ring gear member 444 are continuously interconnected by an interconnecting member 474. The output shaft 19 is continuously connected with the planet carrier assembly member 436, and selectively connectible with the interconnecting member 472 through the torque-transmitting mechanism 452. The sun gear member 442 is selectively connectible with the transmission housing 60 through the torque-transmitting mechanism 458. The planet carrier assembly member 426 is selectively connectible with the input shaft 17 through the torque-transmitting mechanism 450, and selectively connectible with the transmission housing 60 through the torque-transmitting mechanism 456.

The torque-transmitting mechanisms are engaged in combinations of two, as shown in the truth table of FIG. 10, to establish six forward speed ratios and one reverse speed ratio between the input shaft 17 and the output shaft 19 through the planetary gear arrangement 418. The truth table of FIG. 10 provides a description of the combinations of engagement as well as the sequence of engagements to establish six forward speed ratios and one reverse speed ratio. The truth table also provides a numerical example of the speed ratios that are available with the planetary gear arrangement 418 when the ring gear/sun gear tooth ratios of the planetary gearsets 420, 430, and 440 are as given in R1/S1, R2/S2, and R3/S3, respectively. The chart of FIG. 10 provides a numerical example of the ratio steps between adjacent forward speed ratios as well as between the reverse and first forward speed ratio that are available with the planetary gear arrangement 418 when the speed ratios given in the truth table are employed. The truth table also indicates that each of the single step and double step forward interchanges, except the 4$^{th}$ to 6$^{th}$ step, are of the single transition variety.

The reverse speed ratio is established with the engagement of the torque-transmitting mechanism 452 and 456. During the reverse speed ratio, the ring gear member 424, the planet carrier assembly member 436, and output shaft 19 are rotated at a speed determined by the speed of the sun gear member 422 and the ring gear/sun gear tooth ratio of the planetary gearset 420. The numerical value of the reverse speed ratio is determined by the ring gear/sun gear tooth ratio of the planetary gearset 420.

The first forward speed ratio is established with the engagement of the torque-transmitting mechanisms 456 and 458. During the first forward speed ratio, the ring gear member 424 and planet carrier assembly member 446 are rotated at a speed determined by the speed of the sun gear member 422 and the ring gear/sun gear tooth ratio of the planetary gearset 420. The ring gear member 444 and sun gear member 432 are rotated at a speed determined by the speed of the planet carrier assembly member 446 and the ring gear/sun gear tooth ratio of the planetary gearset 440. The planet carrier assembly member 436 and output shaft 19 are rotated at a speed determined by the speed of the ring gear member 434, the speed of the sun gear member 432, and the ring gear/sun gear tooth ratio of the planetary gearset 430. The numerical value of the first forward speed ratio is determined by the ring gear/sun gear tooth ratios of all three planetary gearsets 420, 430, and 440.

The second forward speed ratio is established with the engagement of the torque-transmitting mechanisms 454 and 456. During the second forward speed ratio, the ring gear member 424, planetary gearset 440, and sun gear member 432 are rotated at a speed determined by the speed of the sun gear member 422 and the ring gear/sun gear tooth ratio of the planetary gearset 420. The planet carrier assembly member 436 and therefore output shaft 19 are rotated at a speed determined by the speed of the sun gear member 432, the speed of the ring gear member 434, and the ring gear/sun gear tooth ratio of the planetary gearset 430. The numerical value of the second forward speed ratio is determined by the ring gear/sun gear tooth ratios of the planetary gearsets 420 and 430.

The third forward speed ratio is established with the engagement of the torque-transmitting mechanisms 454 and 458. During the third forward speed ratio, the sun gear member 432 is held stationary. The planet carrier assembly member 436 and therefore output shaft 19 are rotated at a speed determined by the speed of the ring gear member 434 and the ring gear/sun gear tooth ratio of the planetary gearset 430. The numerical value of the third forward speed ratio is determined by the ring gear/sun gear tooth ratio of the planetary gearset 430.

The fourth forward speed ratio is established with the engagement of the torque-transmitting mechanisms 450 and 454. During the fourth forward speed ratio, the input shaft 17, the planetary gearsets 420, 430, and 440, and the output shaft 19 rotate as a single unit providing a direct drive between the input shaft 17 and the output shaft 19 through the planetary gear arrangement 418. Therefore, the numerical value of the fourth forward speed ratio is one.

The fifth forward speed ratio is established with the engagement of the torque-transmitting mechanisms 450 and 458. During the fifth forward speed ratio, the ring gear member 444 and sun gear member 432 are rotated at a speed determined by the speed of the planet carrier assembly member 446 and the ring gear/sun gear tooth ratio of the planetary gearset 440. The planet carrier assembly member 436 and therefore output shaft 19 are rotated at a speed determined by the speed of the ring gear member 434, the speed of the sun gear member 432, and the ring gear/sun gear tooth ratio of the planetary gearset 430. The numerical value of the fifth forward speed ratio is determined by the ring gear/sun gear tooth ratios of the planetary gearsets 430 and 440.

The sixth forward speed ratio is established with the engagement of the torque-transmitting mechanisms 452 and 458. During the sixth forward speed ratio, the sun gear member 432 and ring gear member 444 are rotated at a speed determined by the speed of the ring gear member 434, the speed of the planet carrier assembly member 436, and the ring gear/sun gear tooth ratio of the planetary gearset 430. The planet carrier assembly members 446 and 436, and therefore output shaft 19, are rotated at a speed determined by the speed of the ring gear member 444 and the ring gear/sun gear tooth ratio of the planetary gearset 440. The numerical value of the sixth forward speed ratio is determined by the ring gear/sun gear tooth ratios of the planetary gearsets 430 and 440.

Figures 11, 12:
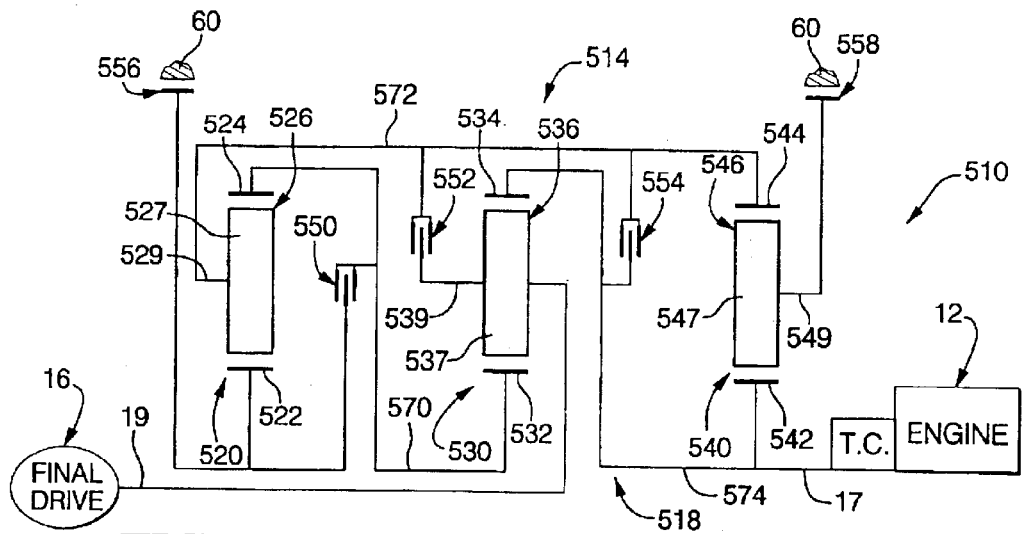
FIG. 11 is a schematic representation of a powertrain having a planetary transmission incorporating another family member of the present invention.
FIG. 12 is a truth table and chart providing some of the operating characteristics of the family member shown in FIG. 11.

A powertrain 510, shown in FIG. 11 includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, three rotating type torque-transmitting mechanisms 550, 552, and 554, and two stationary type torque-transmitting mechanisms 556, and 558.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with both the sun gear member 542 and the ring gear member 544.

The ring gear member 524 and sun gear member 532 are continuously interconnected by an interconnecting member 570, which is selectively connectible with the sun gear member 522 through the torque-transmitting mechanism 550. The planet carrier assembly member 526 and the ring gear member 544 are continuously interconnected by an interconnecting member 572. The ring gear member 534 and sun gear member 542 are continuously interconnected by an interconnecting member 574, which is continuously connected with the input shaft 17. The interconnecting member 574 and interconnecting member 572 are selectively interconnectible through the torque-transmitting mechanism 554. The output shaft 19 is continuously connected with the planet carrier assembly member 536, and selectively connectible with the interconnecting member 572 through the torque-transmitting mechanism 552. The planet carrier assembly member 546 is selectively connectible with the transmission housing 60 through the torque-transmitting mechanism 558. The sun gear member 522 is selectively connectible with the transmission housing 60 through the torque-transmitting mechanism 556.

It will be noted by those familiar with this art that the engagement of the torque-transmitting mechanism 550 will cause the planetary gearset 520 and sun gear member 532 to rotate in unison. Also, the engagement of the torque-transmitting mechanism 554 will cause the planetary gearset 540 and the interconnecting member 572 to rotate in unison with the input shaft 17. The planet carrier assembly member 546 and sun gear member 522 are noncontinuously interconnected with other components of the planetary gear arrangement 518 except by way of the respective torque-transmitting mechanisms.

The torque-transmitting mechanisms are engaged in combinations of two, as seen in the truth table of FIG. 12, to establish six forward speed ratios and one reverse speed ratio between the input shaft 17 and the output shaft 19 through the planetary gear arrangement 518. The truth table also provides a numerical example of the speed ratios that are available with the planetary gear arrangement 518 when the ring gear/sun gear tooth ratios of the planetary gearsets 520, 530, and 540 are as given in R1/S1, R2/S2, and R3/S3, respectively. The chart of FIG. 12 provides a numerical example of the ratio steps between adjacent forward speed ratios as well as between the reverse and first forward speed ratio. Those skilled in the art will recognize that each of the single step forward interchanges and double step forward interchanges, except the $4^{th}$ to $6^{th}$, are of the single transition variety.

The reverse speed ratio is established with the engagement of the torque-transmitting mechanisms 552 and 558. During the reverse speed ratio, the ring gear member 544, planet carrier assembly member 536, and the output shaft 19 are rotated at a speed determined by the speed of the sun gear member 542 and the ring gear/sun gear tooth ratio of the planetary gearset 540. The numerical value of the reverse speed ratio is determined by the ring gear/sun gear tooth ratio of the planetary gearset 540.

The first forward speed ratio is established with the engagement of the torque-transmitting mechanisms 556 and 558. During the first forward speed ratio, the ring gear member 544 and planet carrier assembly member 526 are rotated at a speed determined by the speed of the sun gear member 542 and the ring gear/sun gear tooth ratio of the planetary gearset 540. The ring gear member 524 and sun gear member 532 are rotated at a speed determined by the speed of the planet carrier assembly member 526 and the ring gear/sun gear tooth ratio of the planetary gearset 520. The planet carrier assembly member 536 and therefore output shaft 19 are rotated at a speed determined by the speed of the ring gear member 534, the speed of the sun gear member 532, and the ring gear/sun gear tooth ratio of the planetary gearset 530. The numerical value of the first forward speed ratio is determined by the ring gear/sun gear tooth ratios of the planetary gearsets 520, 530, and 540.

The second forward speed ratio is established with the engagement of the torque-transmitting mechanisms 550 and 558. During the second forward speed ratio, the ring gear member 544, planetary gearset 520, and sun gear member 532 are rotated at a speed determined by the speed of the sun gear member 542 and the ring gear/sun gear tooth ratio of the planetary gearset 540. The planet carrier assembly member 536 and therefore output shaft 19 are rotated at a speed determined by the speed of the ring gear member 534, the speed of the sun gear member 532, and the ring gear/sun gear tooth ratio of the planetary gearset 530. The numerical value of the second forward speed ratio is determined by the ring gear/sun gear tooth ratios of the planetary gearset 530 and 540.

The third forward speed ratio is established with the engagement of the torque-transmitting mechanisms 550 and 556. During the third forward speed ratio, the sun gear member 532 is held stationary. The ring gear member 534 is driven by the input shaft 17. The planet carrier assembly member 536 and therefore output shaft 19 are rotated at a speed determined by the speed of the ring gear member 534 and the ring gear/sun gear tooth ratio of the planetary gearset 530. The numerical value of the third forward speed ratio is determined by the ring gear/sun gear tooth ratio of the planetary gearset 530.

The fourth forward speed ratio is established with the engagement of the torque-transmitting mechanisms 550 and 554. During the fourth forward speed ratio, the planetary gearsets 520, 530, and 540 are rotated in unison with the input shaft 17 and the output shaft 19, thereby establishing a direct drive through the planetary gear arrangement 518. The numerical value of the fourth forward speed ratio is one.

The fifth forward speed ratio is established with the engagement of the torque-transmitting mechanisms 554 and 556. During the fifth forward speed ratio, the planet carrier assembly member 526 is driven by the input shaft 17 through the planetary gearset 540. The ring gear member 524 and sun gear member 532 are rotated at a speed determined by the speed of the planet carrier assembly member 526 and the ring gear/sun gear tooth ratio of the planetary gearset 520. The planet carrier assembly member 536 and therefore output shaft 19 are rotated at a speed determined by the speed of the ring gear member 534, the speed of the sun gear member 532, and the ring gear/sun gear tooth ratio of the planetary gearset 530. The numerical value of the fifth forward speed ratio is determined by the ring gear/sun gear tooth ratios of the planetary gearsets 520 and 530.

The sixth forward speed ratio is established with the engagement of the torque-transmitting mechanisms 552 and 556. During the sixth forward speed ratio, the sun gear member 532 and ring gear member 524 are rotated at a speed determined by the speed of the ring gear member 534, the speed of the planet carrier assembly member 536, and the ring gear/sun gear tooth ratio of the planetary gearset 530. The planet carrier assembly member 526 and the planet carrier assembly member 536, and therefore output shaft 19, are rotated at a speed determined by the speed of the ring gear member 524 and the ring gear/sun gear tooth ratio of the planetary gearset 520. The numerical value of the sixth forward speed ratio is determined by the ring gear/sun gear tooth ratios of the planetary gearsets 520 and 530.

Figures 13, 14:
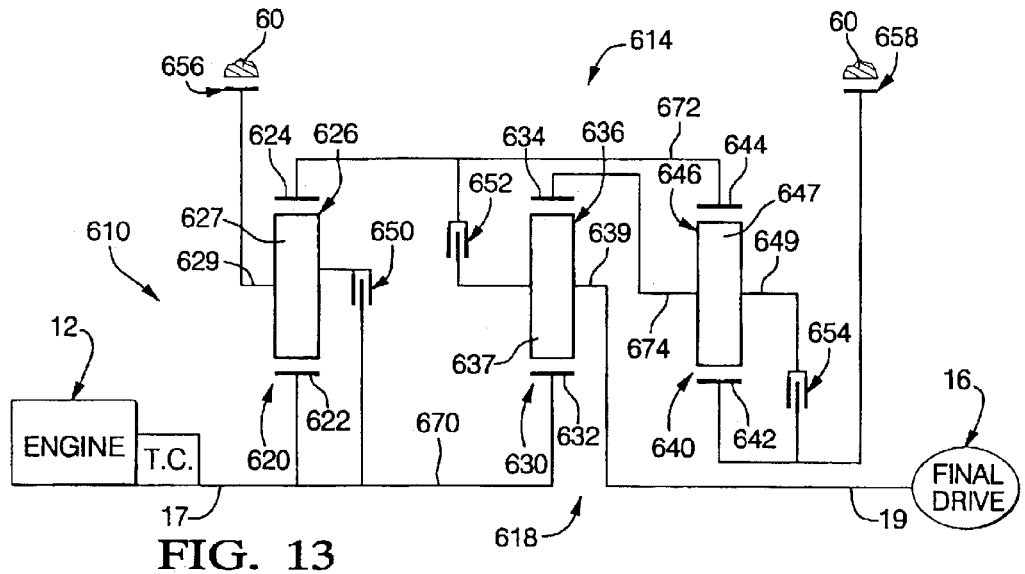
FIG. 13 is a schematic representation of a powertrain having a planetary transmission incorporating another family member of the present invention.
FIG. 14 is a truth table and chart providing some of the operating characteristics of the family member shown in FIG. 13.

A powertrain 610, shown in FIG. 13 includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, three rotating type torque-transmitting mechanisms 650, 652, and 654, and two stationary type torque-transmitting mechanisms 656, and 658.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649 and disposed in meshing relationship with both the sun gear member 642 and the ring gear member 644.

The sun gear member 622 and sun gear member 632 are continuously interconnected by an interconnecting member 670, which is continuously connected with the input shaft 17. The ring gear members 624 and 644 are continuously interconnected by an interconnecting member 672. The ring gear member 634 and planet carrier assembly member 646 are continuously interconnected by an interconnecting member 674. The planet carrier assembly member 636 is continuously connected with the output shaft 19.

The input shaft 17 and interconnecting member 670 are selectively connectible with the planet carrier assembly member 626 through the torque-transmitting mechanism 650. The planet carrier assembly member 626 is selectively connectible with the transmission housing 60 through the torque-transmitting mechanism 656. The interconnecting member 672 is selectively connectible with the planet carrier assembly member 636 and output shaft 19 through the torque-transmitting mechanism 652. The sun gear member 642 is selectively connectible with the interconnecting member 674 through the torque-transmitting mechanism 654, and selectively connectible with the transmission housing 60 through the torque-transmitting mechanism 658. The planet carrier assembly member 626 and sun gear member 642 are not continuously interconnected with other components of the planetary gear arrangement 618 except by way of the torque-transmitting mechanisms.

The torque-transmitting mechanisms are engaged in combinations of two, as seen in the truth table of FIG. 14, to establish six forward speed ratios and one reverse speed ratio between the input shaft 17 and the output shaft 19 through planetary gear arrangement 618. The truth table describes the engagement sequence and combinations to establish the speed ratios. The truth table also provides a numerical example of the speed ratios that are available with planetary gear arrangement 618 when the numerical values of the ring gear/sun gear tooth ratios for the planetary gearsets 620, 630, and 640 are as given in R1/S1, R2/S2, and R3/S3, respectively. The chart of FIG. 14 provides a numerical example of the ratio steps between the adjacent forward speed ratios as well as between the reverse and first forward speed ratio that are present when the ring gear/sun gear tooth ratios given in the truth table are employed. It will be noted that each of the single step forward interchanges as well as the double step forward interchanges are of the single transition variety.

The reverse speed ratio is established with the engagement of the torque-transmitting mechanisms 652 and 656. Those skilled in the art will recognize that this combination of engagements provides a reverse ratio, which has a numerical value determined by the ring gear/sun gear tooth ratio of the planetary gearset 620.

The first forward speed ratio is established with the engagement of the torque-transmitting mechanisms 654 and 656. The numerical value of the first forward speed ratio is determined by the ring gear/sun gear tooth ratios of the planetary gearsets 620 and 630.

The second forward speed ratio is established with the engagement of the torque-transmitting mechanisms 656 and 658. The numerical value of the second forward speed ratio is determined by the ring gear/sun gear tooth ratios of the planetary gearsets 620, 630, and 640.

The third forward speed ratio is established with the engagement of the torque-transmitting mechanisms 654 and 658. The numerical value of the third forward speed ratio is determined by the ring gear/sun gear tooth ratio of the planetary gearset 630.

The fourth forward speed ratio is established with the engagement of the torque-transmitting mechanisms 652 and 658. The numerical value of the fourth forward speed ratio is determined by the ring gear/sun gear tooth ratios of the planetary gearsets 630 and 640.

The fifth forward speed ratio is established with the engagement of the torque-transmitting mechanisms 650 and 658. The numerical value of the fifth forward speed ratio is determined by the ring gear/sun gear tooth ratios of the planetary gearsets 630 and 640.

The sixth forward speed ratio is established with the engagement of the torque-transmitting mechanisms 650 and 652. The sixth forward speed ratio is a direct drive providing a 1:1 ratio between the input shaft 17 and the output shaft 19 through the planetary gear arrangement 618. The sixth forward speed ratio has a numerical value of one.

Figures 15, 16:
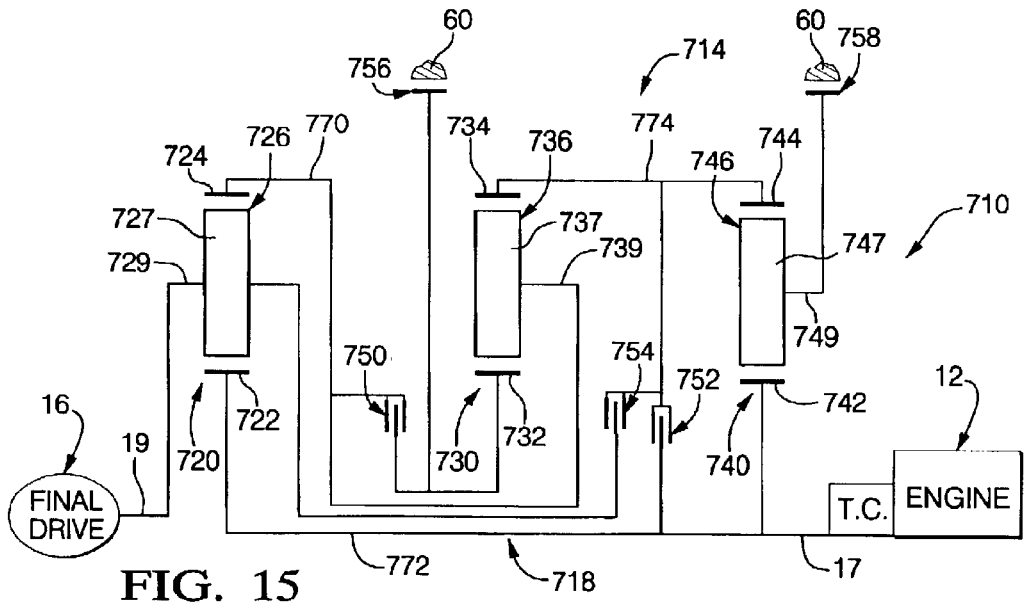
FIG. 15 is a schematic representation of a powertrain having a planetary transmission incorporating another family member of the present invention.
FIG. 16 is a truth table and chart providing some of the operating characteristics of the family member shown in FIG. 15.

A powertrain 710, shown in FIG. 15 includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, three rotating type torque-transmitting mechanisms 750, 752, and 754, and two stationary type torque-transmitting mechanisms 756, and 758.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier 749 and disposed in meshing relationship with both the sun gear member 742 and the ring gear member 744.

The ring gear member 724 and planet carrier assembly member 736 are continuously interconnected by an interconnecting member 770. The sun gear member 722 and sun gear member 742 are continuously interconnected by an interconnecting member 772, which is also connected with the input shaft 17. The ring gear members 734 and 744 are continuously interconnected by an interconnecting member 774, which is selectively connectible with the input shaft 17 through the torque-transmitting mechanism 752, and with the planet carrier assembly member 726 and output shaft 19 through the torque-transmitting mechanism 754. The sun gear member 732 is selectively connectible with the interconnecting member 770 through the torque-transmitting mechanism 750, and selectively connectible with the transmission housing 60 through the torque-transmitting mechanism 756. The planet carrier assembly member 746 is selectively connectible with the transmission housing 60 through the torque-transmitting mechanism 758. It should be noted that the engagement of the torque-transmitting mechanism 750 will cause the planetary gearset 730 and the ring gear member 724 to rotate in unison. The engagement of the torque-transmitting mechanism 752 will cause the planetary gearset 740 and ring gear member 734 to rotate in unison with the input shaft 17.

The torque-transmitting mechanisms are engaged in combinations of two to establish six forward speed ratios and one reverse speed ratio in the planetary gear arrangement 718 between the input shaft 17 and the output shaft 19, as described in the truth table of FIG. 16. The truth table of FIG. 16 also provides a numerical example of the speed ratios that are available in the planetary gear arrangement 718 when the numerical values of the ring gear/sun gear tooth ratios for the planetary gearsets 720, 730, and 740 are as given in R1/S1, R2/S2, and R3/S3, respectively. Also provided in FIG. 16 is a chart which gives a numerical example of the ratio steps between adjacent forward speed ratios as well as between the reverse and first forward speed ratio when the given speed ratios are employed. A review of the truth table will show that each of the single step and double step forward interchanges are of the single transition variety.

Those skilled in the art will recognize that with this combination of engagements the reverse speed ratio has a numerical value determined by the ring gear/sun gear tooth ratio of the planetary gearset 740. The first forward speed ratio has a numerical value determined by the ring gear/sun gear tooth ratios of the planetary gearsets 720 and 740. The second forward speed ratio has a numerical value determined by the ring gear/sun gear tooth ratios of the planetary gearsets 720, 730, and 740. The third forward speed ratio has a numerical value determined by the ring gear/sun gear tooth ratio of the planetary gearset 720. The fourth and fifth forward speed ratios have numerical values determined by the ring gear/sun gear tooth ratios of the planetary gearsets 720 and 730. The sixth forward speed ratio is a direct drive having a numerical value of one.

Figures 17, 18:
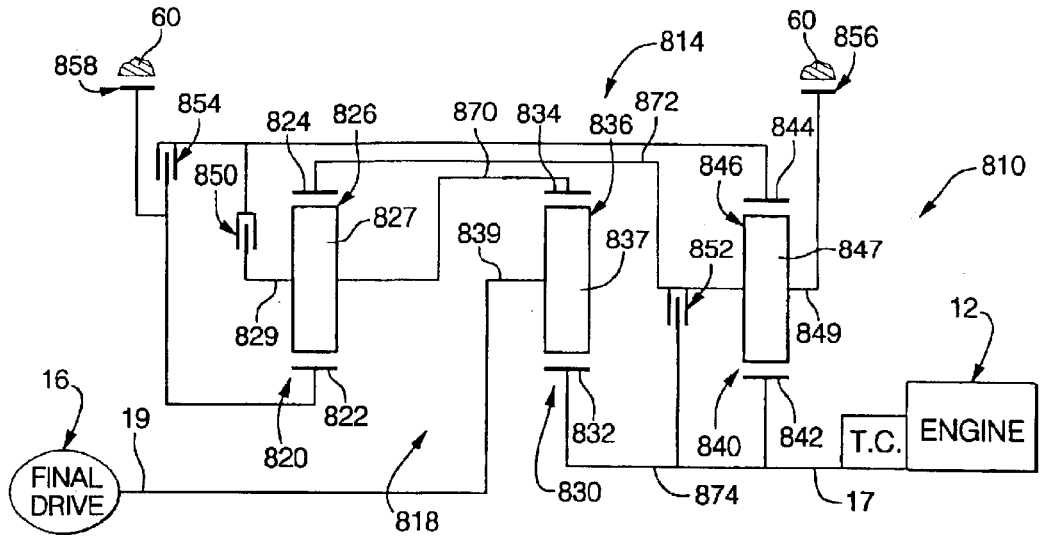
FIG. 17 is a schematic representation of a powertrain having a planetary transmission incorporating another family member of the present invention.
FIG. 18 is a truth table and chart providing some of the operating characteristics of the family member shown in FIG. 17.

A powertrain 810, shown in FIG. 17 includes the engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, three rotating type torque-transmitting mechanisms 850, 852, and 854, and two stationary type torque-transmitting mechanisms 856, and 858.

The planetary gearset 820 includes a sun gear member 822, a ring gear member 824, and a planet carrier assembly member 826. The planet carrier assembly member 826 includes a plurality of pinion gears 827 rotatably mounted on a planet carrier 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on a planet carrier 839 and disposed in meshing relationship with both the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 rotatably mounted on a planet carrier 849 and disposed in meshing relationship with both the sun gear member 842 and the ring gear member 844.

The planet carrier assembly member 826 and ring gear member 834 are continuously interconnected by an interconnecting member 870. The ring gear member 824 and planet carrier assembly member 846 are continuously interconnected by an interconnecting member 872. The sun gear members 832 and 842 are continuously interconnected by an interconnecting member 874, which is also continuously interconnected with the input shaft 17. The planet carrier assembly member 836 is continuously connected with the output shaft 19.

The input shaft 17 and interconnecting member 874 are selectively connectible with the interconnecting member 872 through the torque-transmitting mechanism 852. The interconnecting member 870 is selectively interconnectible with the ring gear member 844 through the torque-transmitting mechanism 850. The ring gear member 844 is selectively interconnectible with the sun gear member 822 through the torque-transmitting mechanism 854. The sun gear member 822 is selectively interconnectible with the transmission housing 60 through the torque-transmitting mechanism 858. The interconnecting member 872 is selectively connectible with the transmission housing 60 through the torque-transmitting mechanism 856.

The torque-transmitting mechanisms are engaged in combinations of two, as shown in the truth table of FIG. 18, to establish six forward speed ratios and one reverse speed ratio between the input shaft 17 and the output shaft 19 through the planetary gear arrangement 818. The truth table also provides a numerical example of the ring gear/sun gear tooth ratios that are available with the planetary gear arrangement 818 when the numerical values for the ring gear/sun gear tooth ratios of the planetary gearsets 820, 830 and 840 are equal to the ratios R1/S1, R2/S2, and R3/S3, respectively. As is evident from the truth table, the single step forward interchanges as well as the double step forward interchanges are of the single transition variety. The chart of FIG. 18 provides a numerical example of the ratio steps between adjacent forward speed ratios as well as between the reverse and first forward speed ratio that are available in the planetary gear arrangement 818 when the given speed ratios are employed.

Those skilled in the art will recognize that the numerical value of the reverse speed ratio is determined by the ring gear/sun gear tooth ratios of the planetary gearsets 830 and 840. The numerical values for the first, third and fourth forward speed ratios are determined by the ring gear/sun gear tooth ratios of all three planetary gearsets 820, 830 and 840. The numerical value of the second forward speed ratio is determined by the ring gear/sun gear tooth ratio of the planetary gearset 830. The numerical value of the fifth forward speed ratio is determined by the ring gear/sun gear tooth ratios of the planetary gearsets 820 and 830. The sixth forward speed ratio is a direct drive from the input shaft 17 and the output shaft 19 through the planetary gear arrangement 818. The numerical value of the sixth forward speed ratio is one.

Figures 19, 20:
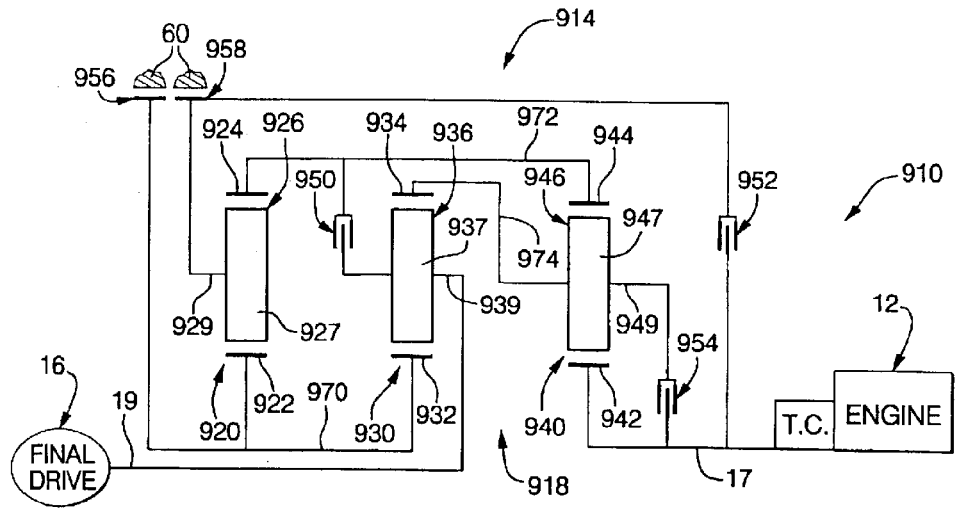
FIG. 19 is a schematic representation of a powertrain having a planetary transmission incorporating another family member of the present invention.
FIG. 20 is a truth table and chart providing some of the operating characteristics of the family member shown in FIG. 19.

A powertrain 910, shown in FIG. 19 includes the engine and torque converter 12, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, three rotating type torque-transmitting mechanisms 950, 952, and 954, and two stationary type torque-transmitting mechanisms 956, and 958.

The planetary gearset 920 includes a sun gear member 922, a ring gear member 924, and a planet carrier assembly member 926. The planet carrier assembly member 926 includes a plurality of pinion gears 927 rotatably mounted on a planet carrier 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of pinion gears 937 rotatably mounted on a planet carrier 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949 and disposed in meshing relationship with both the sun gear member 942 and the ring gear member 944.

The sun gear members 922 and 932 are continuously interconnected by an interconnecting member 970, which is selectively connectible with the transmission housing 60 through the torque-transmitting mechanism 956. The ring gear member 924 and ring gear member 944 are continuously interconnected by an interconnecting member 972. The ring gear member 934 and planet carrier assembly member 946 are continuously interconnected by an interconnecting member 974. The input shaft 17 is continuously connected with the sun gear member 942 and selectively connectible with the interconnecting member 974 through the torque-transmitting mechanism 954, and also selectively connectible with the planet carrier assembly member 926 through the torque-transmitting mechanism 952. The planet carrier assembly member 936 is continuously connected with the output shaft 19, and selectively connectible with the interconnecting member 972 through the torque-transmitting mechanism 950. The planet carrier assembly member 926 is selectively connectible with the transmission housing 60 through the torque-transmitting mechanism 958.

The torque-transmitting mechanisms are selectively engaged in combinations of two, as shown in the truth table of the FIG. 20, to establish six forward speed ratios and one reverse speed ratio in the planetary gear arrangement 918 between the input shaft 17 and the output shaft 19. The truth table also provides a numerical example of the speed ratios that are available in the planetary gear arrangement 918 when the numerical values for the ring gear/sun gear tooth ratios of the planetary gearsets 920, 930, and 940 are as given in R1/S1, R2/S2, and R3/S3, respectively. It is apparent from the truth table that each of the single step forward interchanges and the double step forward interchanges are of the single transition variety. The chart of FIG. 20 provides a numerical example of the ratio steps that are available between adjacent forward speed ratios as well as between the reverse and first forward speed ratio when the speed ratios given in the truth table are employed.

Those skilled in the art will recognize that the reverse speed ratio has a numerical value determined by the ring gear/sun gear tooth ratios of the planetary gearsets 920 and 930. The first and fifth forward speed ratios have numerical values determined by the ring gear/sun gear tooth ratios of all three planetary gearsets 920, 930, and 940. The second and third forward speed ratios have numerical values determined by the ring gear/sun gear tooth ratios of the planetary gearsets 930 and 940. The fourth forward speed ratio has a numerical value determined by ring gear/sun gear tooth ratio of the planetary gearset 930. The sixth forward speed ratio is a direct drive having a numerical value of one.

Figures 21, 22:
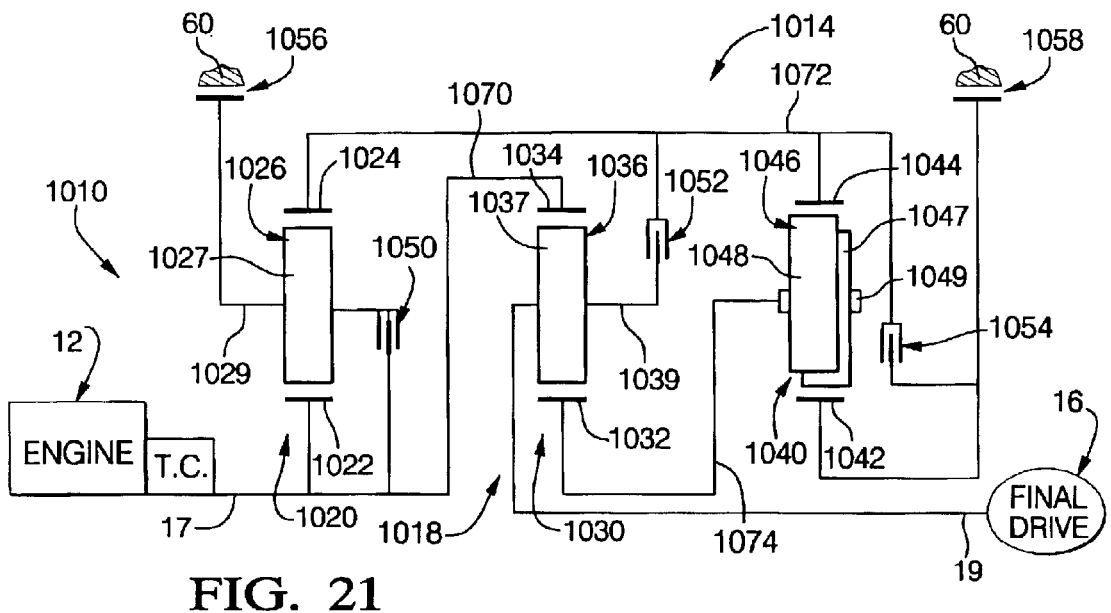
FIG. 21 is a schematic representation of a powertrain having a planetary transmission incorporating another family member of the present invention.
FIG. 22 is a truth table and chart providing some of the operating characteristics of the family member shown in FIG. 21.

A powertrain 1010, shown in FIG. 21 includes the engine and torque converter 12, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, three rotating type torque-transmitting mechanisms 1050, 1052, and 1054, and two stationary type torque-transmitting mechanisms 1056, and 1058.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier 1029 and disposed in meshing relationship with both the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gears 1037 rotatably mounted on a planet carrier 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality pairs of meshing of pinion gears 1047 and 1048 that are rotatably mounted on a planet carrier 1049 and disposed in meshing relationship with the sun gear member 1042 and the ring gear member 1044, respectively.

The sun gear member 1022 and ring gear member 1034 are continuously interconnected by an interconnecting member 1070, which is continuously connected with the input shaft 17. The ring gear member 1024 and the ring gear member 1044 are continuously interconnected by an interconnecting member 1072. The sun gear member 1032 and planet carrier assembly member 1046 are continuously interconnected by an interconnecting member 1074.

The output shaft 19 is continuously connected with the planet carrier assembly member 1036, and selectively connectible with the interconnecting member 1072 through the torque-transmitting mechanism 1052. The input shaft 17 and interconnecting member 1070 are selectively connectible with the planet carrier assembly member 1026 through the torque-transmitting mechanism 1050. The planet carrier assembly member 1026 is selectively connectible with the transmission housing 60 through the torque-transmitting mechanism 1056. The sun gear member 1042 is selectively connectible with the interconnecting member 1072 through the torque-transmitting mechanism 1054, and selectively connectible with the transmission housing 60 through the torque-transmitting mechanism 1058. The sun gear member 1042 and planet carrier assembly member 1026 are noncontinuously interconnected members of the planetary gear arrangement 1018.

The torque-transmitting mechanisms are selectively engaged in combinations of two to establish six forward speed ratios and one reverse speed ratio between the input shaft 17 and the output shaft 19 through the planetary gear arrangement 1018, as shown in the truth table of FIG. 22. The truth table also provides a numerical example of the speed ratios that are available with the planetary gear arrangement 1018 when the ring gear/sun gear tooth ratios of the planetary gearsets 1020, 1030, and 1040 are as given in R1/S1, R2/S2, and R3/S3, respectively. It will be recognized from the truth table that the single step and double step forward interchanges, except the $4^{th}$ to $6^{th}$ step, are of the single transition variety. The chart of FIG. 22 provides a numerical example for the ratio steps between the adjacent forward speed ratios as well as between the reverse and first forward speed ratio when the given speed ratios are utilized.

Those skilled in the art will recognize that the reverse speed ratio has a numerical value determined by the ring gear/sun gear tooth ratio of the planetary gearset 1020. The first forward speed ratio has a numerical value determined by the ring gear/sun gear tooth ratios of all three planetary gearsets 1020, 1030, and 1040. The second forward speed ratio has a numerical value determined by the ring gear/sun gear tooth ratios of the planetary gearset 1020 and 1030. The third forward speed ratio has a numerical value determined by the ring gear/sun gear tooth ratio of the planetary gearset 1030. The fourth forward speed ratio is a direct drive having a numerical value of one. The fifth and sixth forward speed ratios have numerical values determined by the ring gear/sun gear tooth ratios of the planetary gearsets 1030 and 1040.

Figures 23, 24:
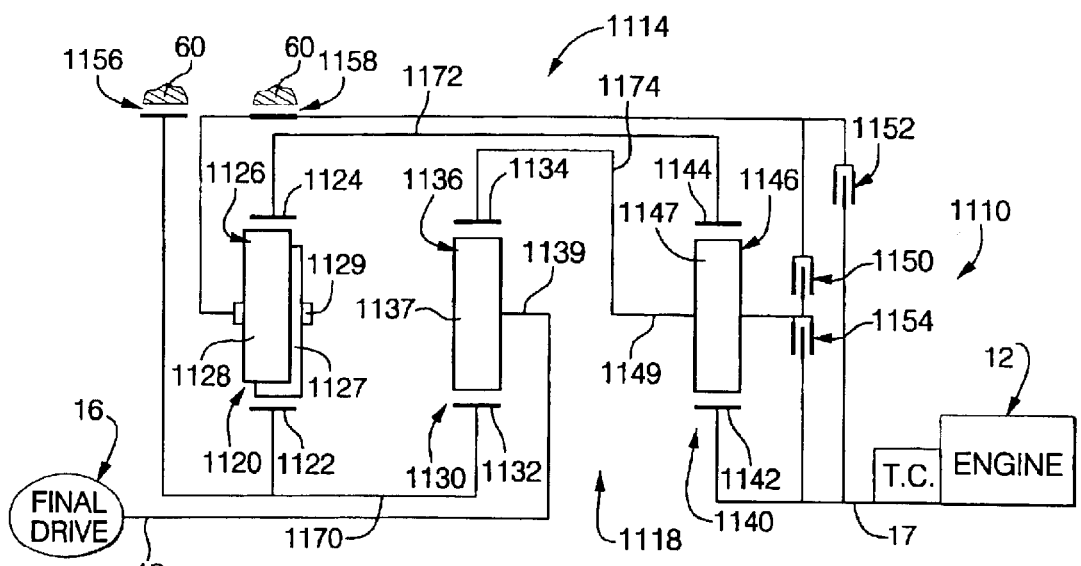
FIG. 23 is a schematic representation of a powertrain having a planetary transmission incorporating another family member of the present invention.
FIG. 24 is a truth table and chart providing some of the operating characteristics of the family member shown in FIG. 23.

A powertrain 1110, shown in FIG. 23 includes the engine and torque converter 12, a planetary transmission 1114, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140, three rotating type torque-transmitting mechanisms 1150, 1152, and 1154, and two stationary type torque-transmitting mechanisms 1156, and 1158.

The planetary gearset 1120 includes a sun gear member 1122, a ring gear member 1124, and a planet carrier assembly member 1126. The planet carrier assembly member 1126 includes a plurality of pairs of meshing pinion gears 1127 and 1128 rotatably mounted on a planet carrier 1129 and disposed in meshing relationship with the sun gear member 1122 and the ring gear member 1124, respectively.

The planetary gearset 1130 includes a sun gear member 1132, a ring gear member 1134, and a planet carrier assembly member 1136. The planet carrier assembly member 1136 includes a plurality of pinion gears 1137 rotatably mounted on a planet carrier 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 rotatably mounted on a planet carrier 1149 and disposed in meshing relationship with both the sun gear member 1142 and the ring gear member 1144.

The input shaft 17 is continuously connected with the sun gear member 1142. The output shaft 19 is continuously interconnected with the planet carrier assembly member 1136. The sun gear members 1122 and 1132 are continuously interconnected by an interconnecting member 1170, which is selectively connectible with the transmission housing 60 through the torque-transmitting mechanism 1156. The ring gear members 1124 and 1144 are continuously interconnected by an interconnecting member 1172. The ring gear member 1134 and planet carrier assembly member 1146 are continuously interconnected by an interconnecting member 1174, which is selectively connectible with the input shaft 17 through the torque-transmitting mechanism 1154, and selectively interconnectible with the planet carrier assembly member 1126 through the torque-transmitting mechanism 1150. The planet carrier assembly member 1126 is selectively connectible with the input shaft 17 through the torque-transmitting mechanism 1152, and selectively connectible with the transmission housing 60 through the torque-transmitting mechanism 1158. The planet carrier assembly member 1126 is a noncontinuously interconnected member of the planetary gear arrangement 1118.

The torque-transmitting mechanisms are engaged in combinations of two, as shown in the truth table of FIG. 24, to establish six forward speed ratios and one reverse speed ratio between the input shaft 17 and the output shaft 19 through the planetary gear arrangement 1118. The truth table also provides a numerical example of the speed ratios that can be obtained with the planetary gear arrangement 1118 when the numerical values for the ring gear/sun gear tooth ratios of the planetary gearsets 1120, 1130, and 1140 are as given in R1/S1, R2/S2, and R3/S3, respectively. As noted in the truth table, the single step and double step forward interchanges are all of the single transition variety. The chart of FIG. 24 provides a numerical example of the ratio steps between adjacent forward speed ratios as well as between the reverse and first forward speed ratio when the given speed ratio values are employed.

Those skilled in the art will recognize that the reverse speed ratio has a numerical value determined by the ring gear/sun gear tooth ratios of all three planetary gearsets 1120, 1130, and 1140. The first forward speed ratio has a numerical value determined by the ring gear/sun gear tooth ratios of the planetary gearsets 1130 and 1140. The second and third forward speed ratios have numerical values determined by the ring gear/sun gear tooth ratios of all three planetary gearsets 1120, 1130, and 1140. The fourth forward speed ratio has a numerical value determined by the ring gear/sun gear tooth ratio of the planetary gearset 1130. The fifth forward speed ratio is a direct drive having a numerical value of one. The sixth forward speed ratio has a numerical value determined by the ring gear/sun gear tooth ratios of the planetary gearset 1120 and 1130.

Each of the planetary arrangements of the family members has at least one member that is non-continuously interconnected with one of the input shaft 17, the output shaft 19, the housing 60, or another member of one of the planetary gearsets. For example the planetary arrangement 18 has the ring gear member 24 that is non-continuously interconnected to other components. The ring gear member 24 is of course interconnected by the selective application of either of the torque transmitting mechanisms 50, 52, and 58. In the planetary arrangement 118, the planet carrier assembly member 136 and the sun gear member 122 are non-continuously interconnected members.

What is claimed is:

1. A multi-speed planetary transmission comprising:
    an input shaft;
    an output shaft;
    a transmission housing;
    a first planetary gearset having a first member, a second member, and a third member;
    a second planetary gearset having a first member, a second member, and a third member;
    a third planetary gearset having a first member, a second member, and a third member;
    a first interconnecting member continuously interconnecting said first member of said first planetary gearset with said first member of said second planetary gearset;
    a second interconnecting member continuously interconnecting said second member of said first planetary gearset with said first member of said third planetary gearset;
    a third interconnecting member continuously interconnecting said second member of said second planetary gearset with said second member of said third planetary gearset;
    said input shaft being continuously interconnected with at least one member of one of said planetary gearsets;
    said output shaft being continuously interconnected with at least one member of said planetary gearsets that is not connected with said input shaft;
    five torque transmitting mechanisms including a first selectively engageable stationary torque transmitting mechanism, a second selectively engageable stationary torque transmitting mechanism, and first, second, and third selectively engageable rotating torque transmitting mechanisms; and
    said five torque transmitting mechanisms being selectively engaged in combinations of two to establish at least six forward speed ratios and one reverse speed ratio between said input shaft and said output shaft.

2. The multi-speed planetary transmission defined in claim 1 further comprising:
    either said first rotating torque-transmitting mechanism selectively interconnecting said third member of said first planetary gearset with said third interconnecting member, said second rotating torque-transmitting mechanism selectively interconnecting said third member of said first planetary gearset with said input shaft, and said third rotating torque-transmitting mechanism selectively interconnecting said input shaft with said third interconnecting member, or said first rotating torque-transmitting mechanism selectively interconnecting said third member of said second planetary gearset with said second interconnecting member, said second rotating torque-transmitting mechanism selectively interconnecting said third member of said first planetary gearset with said third member of said second planetary gearset, and said third rotating torque-transmitting mechanism selectively interconnecting said input shaft with said third member of said second planetary gearset, or said first rotating torque-transmitting mechanism selectively interconnecting said third member of said second planetary gearset with said second interconnecting member, said second rotating torque-transmitting mechanism selectively interconnecting said third member of said second planetary gearset with said third interconnecting member, said third rotating torque-transmitting mechanism selectively interconnecting said third member of said second planetary gearset with said third member of said third planetary gearset, or first rotating torque-transmitting mechanism selectively interconnecting said input shaft with said third member of said second planetary gearset, said second rotating torque-transmitting mechanism selectively interconnecting said input shaft with said third interconnecting member, and said third rotating torque-transmitting mechanism selectively interconnecting said third member of said second planetary gearset with said third member of said third planetary gearset, or said first rotating torque-transmitting mechanism selectively interconnecting said input shaft with said third member of said first planetary gearset, said second rotating torque-transmitting mechanism selectively interconnecting said second interconnecting member with said third member of said second planetary gearset, and said third rotating torque-transmitting mechanism selectively interconnecting said third member of said first planetary gearset with said second interconnecting member, or first rotating torque-transmitting mechanism selectively interconnecting said third member of said first planetary gearset with said first interconnecting member, said second rotating torque-transmitting mechanism selectively interconnecting said second interconnecting member with said third member of said second planetary gearset, and said third rotating torque-transmitting mechanism selectively interconnecting said input shaft with said second interconnecting member, or said first rotating torque-transmitting mechanism selectively interconnecting said input shaft with said third member of said first planetary gearset, said second rotating torque-transmitting mechanism selectively interconnecting said second interconnecting member with said third member of said second planetary gearset, and said third rotating torque-transmitting mechanism selectively interconnecting said third member of said third planetary gearset with said third interconnecting member, or said first rotating torque-transmitting mechanism selectively interconnecting said third member of said second planetary gearset with said first interconnecting member, said second rotating torque-transmitting mechanism selectively interconnecting said input shaft with said third interconnecting member, and said third rotating torque-transmitting mechanism selectively interconnecting said third interconnecting member with said third member of said first planetary gearset, or said first rotating torque-transmitting mechanism selectively interconnecting said third member of said third planetary gearset with said first interconnecting member, said second rotating torque-transmitting mechanism selectively interconnecting said input shaft with said second interconnecting member, and said third rotating torque-transmitting mechanism selectively interconnecting said third member of said first planetary gearset with said third member of said third planetary gearset, or said first rotating torque-transmitting mechanism selectively interconnecting said second interconnecting member with said third member of said second planetary gearset, said second rotating torque-transmitting mechanism selectively interconnecting said input shaft with said third member of said first planetary gearset, and said third rotating torque-transmitting mechanism selectively interconnecting said input shaft with said third interconnecting member, or said first rotating torque-transmitting mechanism selectively interconnecting said input shaft with said third member of said first planetary gearset, said second rotating torque-transmitting mechanism selectively interconnecting said second interconnecting member with said third member of said second planetary gearset, and said third rotating torque-transmitting mechanism selectively interconnecting said third member of said third planetary gearset with said second interconnecting member, or said first rotating torque-transmitting mechanism selectively interconnecting said third member of said first planetary gearset with said third interconnecting member, said second rotating torque-transmitting mechanism selectively interconnecting said input shaft with said third member of said first planetary gearset, and said third rotating torque-transmitting mechanism selectively interconnecting said input shaft with said third interconnecting member.

3. A multi-speed planetary transmission comprising:

an input shaft;

an output shaft;

a transmission housing;

a first planetary gearset having a first member, a second member, and a third member;

a second planetary gearset having a first member, a second member, and a third member;

a third planetary gearset having a first member, a second member, and a third member;

a first interconnecting member continuously interconnecting said first member of said first planetary gearset with said first member of said second planetary gearset;

a second interconnecting member continuously interconnecting said second member of said first planetary gearset with said first member of said third planetary gearset;

a third interconnecting member continuously interconnecting said second member of said second planetary gearset with said second member of said third planetary gearset;

five selectively engageable torque-transmitting mechanisms wherein either said input shaft is continuously connected with said third member of said third planetary gearset, said output shaft is continuously connected with said third member of said second planetary gearset, said first torque-transmitting mechanism selectively interconnecting said third member of said first planetary gearset with said third interconnecting member, said second torque-transmitting mechanism selectively interconnecting said third member of said first planetary gearset with said input shaft, said third torque-transmitting mechanism selectively interconnecting said input shaft with said third interconnecting member, said fourth torque-transmitting mechanism selectively interconnecting said transmission housing with said first interconnecting member, and said fifth torque-transmitting mechanism selectively interconnecting said transmission housing with said third member of said first planetary gearset or said input is continuously connected with said third interconnecting member, said output shaft is continuously connected with said third member of said third planetary gearset said first torque-transmitting mechanism selectively interconnecting said third member of said second planetary gearset with said second interconnecting member, said second torque-transmitting mechanism selectively interconnecting said third member of said first planetary gearset with said third member of said second planetary gearset, said third torque-transmitting mechanism selectively interconnecting said input shaft with said third member of said second planetary gearset, said fourth and fifth torque transmitting mechanisms selectively interconnecting said first interconnecting member and said third member of said first planetary gearset respectively or said input shaft is continuously connected with said first interconnecting member, said output is continuously connected with said third member of said first planetary gearset said first torque-transmitting mechanism selectively interconnecting said third member of said second planetary gearset with said second interconnecting member, said second torque-transmitting mechanism selectively interconnecting said third member of said second planetary gearset with said third interconnecting member, said third torque-transmitting mechanism selectively interconnecting said third member of said second planetary gearset with said third member of said third planetary gearset, said fourth torque-transmitting mechanism selectively interconnecting said transmission housing with said third interconnecting member, and said fifth torque-transmitting mechanism selectively interconnecting said third member of said third planetary gearset, or said input shaft is continuously connected with said third member of said first planetary gearset, said output shaft is continuously connected with said first interconnecting member, said first torque-transmitting mechanism selectively interconnecting said input shaft with said third member of said second planetary gearset, said second torque-transmitting mechanism selectively interconnecting said input shaft with said third interconnecting member, said third torque-transmitting mechanism selectively interconnecting said third member of said second planetary gearset with said third member of said third planetary gearset, said fourth torque-transmitting mechanism selectively interconnecting said transmission housing with said third interconnecting member, said fifth torque-transmitting mechanism selectively interconnecting said transmission housing with said third member of said third planetary gearset, or input shaft is continuously connected with said first interconnecting member, said output shaft is continuously connected with said third member of said second planetary gearset, said first torque-transmitting mechanism selectively interconnecting said input shaft with said third member of said first planetary gearset, said second torque-transmitting mechanism selectively interconnecting said second interconnecting member with said third member of said second planetary gearset, said third torque-transmitting mechanism selectively interconnecting said third member of said first planetary gearset with said second interconnecting member, said fourth torque-transmitting mechanism selectively interconnecting said transmission housing with said third member of said first planetary gearset, and said fifth torque-transmitting mechanism selectively interconnecting said transmission housing with said third member of said third planetary gearset, or said input shaft is continuously connected with said third interconnecting member, said output shaft is continuously connected with said third member of said second planetary gearset, said first torque-transmitting mechanism selectively interconnecting said third member of said first planetary gearset with said first interconnecting member, said second torque-transmitting mechanism selectively interconnecting said second interconnecting member with said third member of said second planetary gearset, said third torque-transmitting mechanism selectively interconnecting said input shaft with said second interconnecting member, said fourth torque-transmitting mechanism selectively interconnecting said transmission housing with said third member of said first planetary gearset, and said fifth torque-transmitting mechanism selectively interconnecting said transmission housing with said third member of said third planetary gearset, or said input shaft is continuously connected with said second interconnecting member, said output shaft is continuously connected with said third member of said first planetary gearset, said first torque-transmitting mechanism selectively interconnecting said third member of said second planetary gearset with said first interconnecting member, said second torque-transmitting mechanism selectively interconnecting said input shaft with said third interconnecting member, said third torque-transmitting mechanism selectively interconnecting said third interconnecting member with said third member of said first planetary gearset, said fourth torque-transmitting mechanism selectively interconnecting said transmission housing with said third member of said second planetary gearset, and said fifth torque-transmitting mechanism selectively interconnecting said transmission housing with said third member of said third planetary gearset, or said input shaft is continuously connected with said third interconnecting member, said output shaft is continuously connected with said third member of said second planetary gearset, said first torque-transmitting mechanism selectively interconnecting said third member of said third planetary gearset with said first interconnecting member, said second torque-transmitting mechanism selectively interconnecting said input shaft with said second interconnecting member, said third torque-transmitting mechanism selectively interconnecting said third member of said first planetary gearset with said third member of said third planetary gearset, said fourth torque-transmitting mechanism selectively interconnecting said transmission housing with said second interconnecting member, and said fifth torque-transmitting mechanism selectively interconnecting said transmission housing with said third member of said first planetary gearset, or said input shaft is continuously connected with said third member of said third planetary gearset, said output shaft is continuously connected with said third member of said second planetary gearset, said first torque-transmitting mechanism selectively interconnecting said second interconnecting member with said third member of said second planetary gearset, said second torque-transmitting mechanism selectively interconnecting said input shaft with said third member of said first planetary gearset, and said third torque-transmitting mechanism selectively interconnecting said input shaft with said third interconnecting member, said fourth torque-transmitting mechanism selectively interconnecting said transmission housing with said first interconnecting member, and said fifth torque-transmitting mechanism selectively interconnecting said transmission housing with said third member of said first planetary gearset, or said input shaft is continuously connected with said first interconnecting member, said output shaft is continuously connected with said third member of said second planetary gearset, said first torque-transmitting mechanism selectively interconnecting said input shaft with said third member of said first planetary gearset, said second torque-transmitting mechanism selectively interconnecting said second interconnecting member with said third member of said second planetary gearset, said third torque-transmitting mechanism selectively interconnecting said third member of said third planetary gearset with said second interconnecting member, said fourth torque-transmitting mechanism selectively interconnecting said transmission housing with said third member of said first planetary gearset, and said fifth torque-transmitting mechanism selectively interconnecting said transmission housing with said third member of said third planetary gearset, or said input shaft is continuously connected with said third member of said third planetary gearset, said output shaft is continuously connected with said third member of said second planetary gearset said first torque-transmitting mechanism selectively interconnecting said third member of said first planetary gearset with said third interconnecting member, said second torque-transmitting mechanism selectively interconnecting said input shaft with said third member of said first planetary gearset, said third torque-transmitting mechanism selectively interconnecting said input shaft with said third interconnecting member, said fourth torque-transmitting mechanism selectively interconnecting said transmission housing with said first interconnecting member, and said fifth torque-transmitting mechanism selectively interconnecting said transmission housing with said third member of said first planetary gearset; and said torque transmitting mechanisms being selectively engaged in combinations of two to establish at least six forward speed ratios and one reverse speed ratio between said input shaft and said output shaft.

* * * * *